United States Patent
Bray et al.

(10) Patent No.: US 8,961,715 B2
(45) Date of Patent: *Feb. 24, 2015

(54) ALUMINUM ALLOY PRODUCTS HAVING IMPROVED PROPERTY COMBINATIONS AND METHOD FOR ARTIFICIALLY AGING SAME

(71) Applicant: Alcoa Inc., Pittsburgh, PA (US)

(72) Inventors: Gary H. Bray, Murrysville, PA (US); Dhruba J. Chakrabarti, Rego Park, NY (US); Diana K. Denzer, Lower Burrell, PA (US); Jen C. Lin, Export, PA (US); John Newman, Export, PA (US); Gregory B. Venema, Bettendorf, IA (US); Cagatay Yanar, Bethel Park, PA (US); Julien Boselli, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,536

(22) Filed: Apr. 17, 2014

(65) Prior Publication Data
US 2014/0227131 A1 Aug. 14, 2014

Related U.S. Application Data

(63) Continuation of application No. 12/152,635, filed on May 14, 2008, which is a continuation-in-part of application No. 11/748,021, filed on May 14, 2007, now Pat. No. 8,673,209.

(51) Int. Cl.
*C22C 21/10* (2006.01)
*B64C 3/26* (2006.01)
*B64C 3/18* (2006.01)
*C22F 1/053* (2006.01)
*B64C 1/00* (2006.01)

(52) U.S. Cl.
CPC . *B64C 3/26* (2013.01); *B64C 3/182* (2013.01); *B64C 3/185* (2013.01); *B64C 3/187* (2013.01); *B64C 2001/0081* (2013.01); *C22C 21/10* (2013.01); *C22F 1/053* (2013.01); *Y02T 50/42* (2013.01)
USPC ............................................. 148/439; 420/532

(58) Field of Classification Search
CPC ....................................................... C22C 21/10
USPC ................. 148/437–439, 691–694, 698–701; 420/528, 529, 531–533
See application file for complete search history.

(56) References Cited

U.S. PATENT DOCUMENTS

2004/0136862 A1* 7/2004 Bray et al. ..................... 420/532

* cited by examiner

*Primary Examiner* — Brian Walck
(74) *Attorney, Agent, or Firm* — Greenberg Traurig, LLP

(57) ABSTRACT

Aluminum alloy products about 4 inches thick or less that possesses the ability to achieve, when solution heat treated, quenched, and artificially aged, and in parts made from the products, an improved combination of strength, fracture toughness and corrosion resistance, the alloy consisting essentially of: about 6.8 to about 8.5 wt. % Zn, about 1.5 to about 2.00 wt. % Mg, about 1.75 to about 2.3 wt. % Cu; about 0.05 to about 0.3 wt. % Zr, less than about 0.1 wt. % Mn, less than about 0.05 wt. % Cr, the balance Al, incidental elements and impurities and a method for making same. The instantly disclosed alloys are useful in making structural members for commercial airplanes including, but not limited to, upper wing skins and stringers, spar caps, spar webs and ribs of either built-up or integral construction.

1 Claim, 18 Drawing Sheets

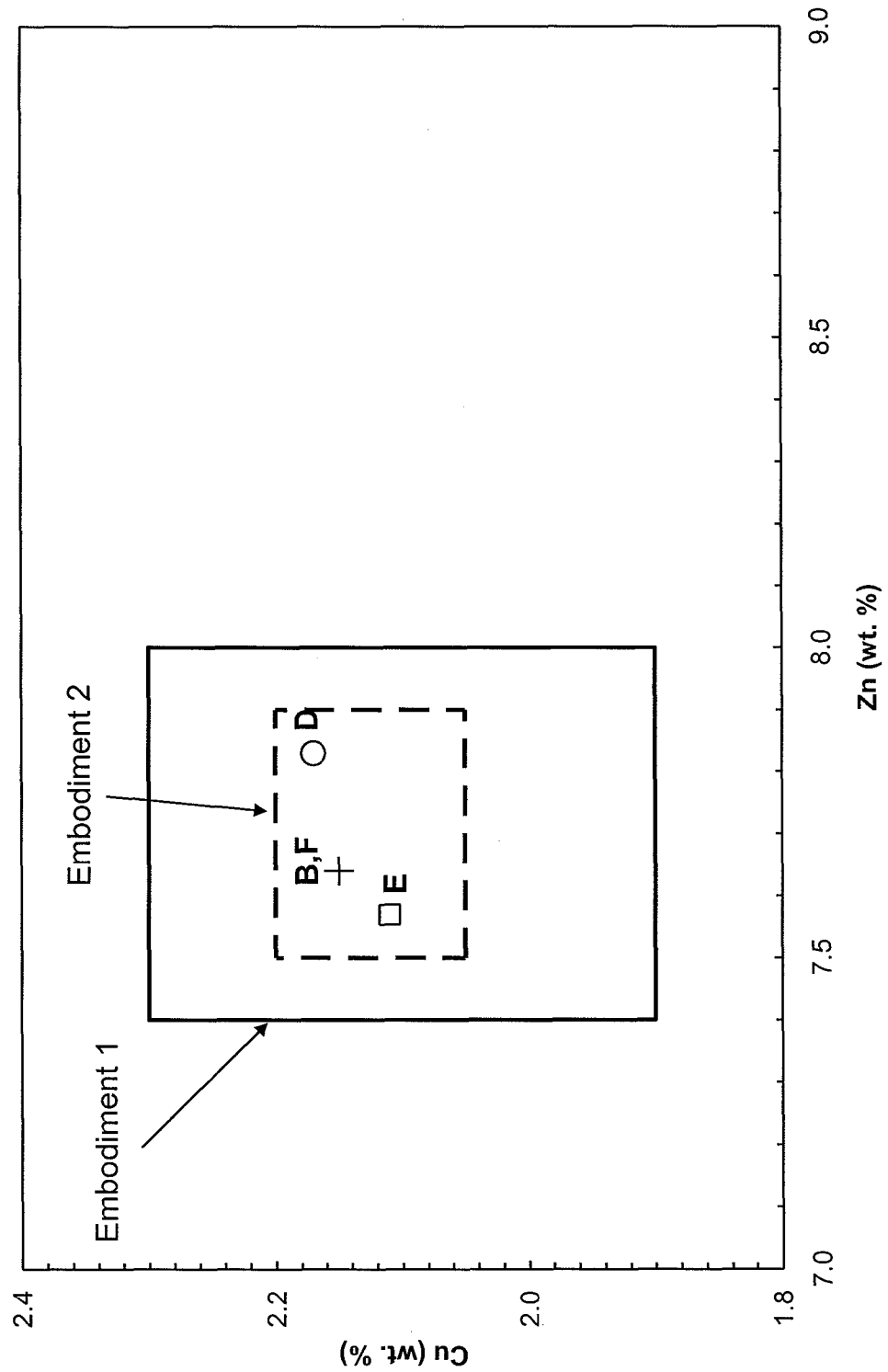

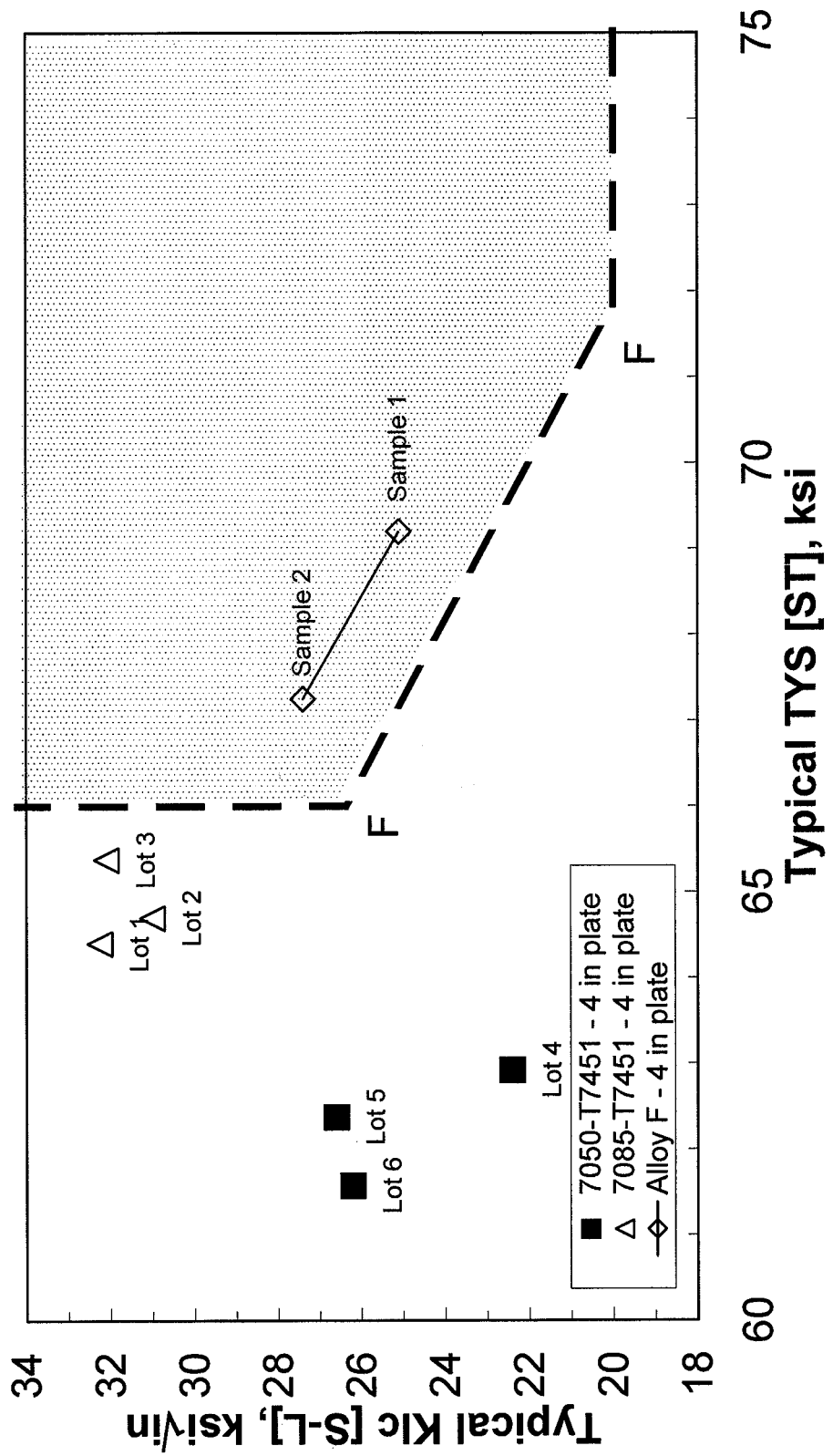

ALUMINUM ALLOY PRODUCTS HAVING IMPROVED PROPERTY COMBINATIONS AND METHOD FOR ARTIFICIALLY AGING SAME

CROSS-REFERENCE TO RELATED APPLICATION

This application is a continuation of U.S. patent application Ser. No. 12/152,635, filed May 14, 2008, which is a continuation-in-part of U.S. patent application Ser. No. 11/748,021, filed May 14, 2007, now U.S. Pat. No. 8,673,209, both entitled "ALUMINUM ALLOY PRODUCTS HAVING IMPROVED PROPERTY COMBINATIONS AND METHOD FOR ARTIFICIALLY AGING SAME", each of which are incorporated herein by reference in their entirety.

BACKGROUND

1. Field of the Disclosure

The present disclosure relates to aluminum alloys, particularly 7000 Series (or 7XXX) aluminum ("Al") alloys as designated by the Aluminum Association. More particularly to aluminum alloy products useful in making structural members for commercial airplanes that are at most 4 inches in thickness.

2. Description of the Related Art

The industry demands on aluminum alloys have become more and more rigorous with each new series of aircraft manufactured by the aerospace industry. As the size of new jet aircraft get larger, or as current jetliner models grow to accommodate heavier payloads and/or longer flight ranges to improve performance and economy, the demand for weight savings in structural components such as wing components continues to increase.

A traditional aircraft wing structure is shown in FIG. 1 and includes a wing box generally designated by numeral 2. Wing box 2 extends outwardly from the fuselage as the main strength component of the wing and runs generally perpendicular to the plane of FIG. 1. In wing box 2, upper and lower wing skins 4 and 6 are spaced by vertical structural members or spars 12 and 20 extending between or bridging upper and lower wing skins. Wing box 2 also includes ribs which extend generally from one spar to the other. These ribs lie parallel to the plane of FIG. 1 whereas the wing skins and spars run perpendicular to the FIG. 1 plane.

The upper wing cover is typically comprised of a skin 4 and stiffening elements or stringers 8. These stiffening elements can be attached separately by fastening or made integral with the skin to eliminate the need for separate stringers and rivets. During flight, the upper wing structure of a commercial aircraft wing is compressively loaded, calling for alloys with high compressive strength. This requirement has led to the development of alloys with increasingly higher compressive strength while still maintaining a nominal level of fracture toughness. The upper wing structural members of today's large aircraft are typically made from high strength 7XXX series aluminum alloys such as 7150 (U.S. Reissue Pat. No. 34,008), 7449 (U.S. Pat. No. 5,560,789) or 7055 aluminum (U.S. Pat. No. 5,221,377). More recently, U.S. Pat. No. 7,097,719 discloses an improved 7055 aluminum alloy.

However, the development of ultra-high capacity aircraft has led to new design requirements. Due to a larger and heavier wing and high aircraft gross takeoff weights, these aircraft experience high down-bending loads during landing producing high tensile loads in the upper wing structural members. While the tensile strength in the current upper wing alloys is more than adequate to withstand these down-bending loads, their fracture toughness becomes a limiting design criterion on the inboard portions of the upper cover. This has led to a desire for alloys for the upper structural members of ultra-large aircraft having very high fracture toughness more akin to that in lower wing skin alloys such as 2324 (U.S. Pat. No. 4,294,625) even if high strength must be sacrificed to some extent. That is, there has been a shift in the optimum combination of strength and toughness needed to maximize weight savings in the upper wing structural members of an ultra-large aircraft to significantly higher fracture toughness and lower strength.

New welding technologies such as friction stir welding have also opened many new possibilities for both design and alloy products for use in wing spar and rib components for weight reduction and/or cost savings. For maximum performance of a spar, the part of the spar which joins to the upper wing skin would have properties similar to the upper skin, and the part of the spar which connects to the lower wing skin would have properties similar to the lower wing skin. This has led to the use of "built-up" spars, comprising an upper spar cap 14 or 22, a web 18 or 20, and a lower spar cap 16 or 24, joined by fasteners (not shown). This "built-up" design allows optimal alloy products to be used for each component. However, the installation of the many fasteners required increases assembly cost. The fasteners and fastener holes may also be structural weak links and parts may have to be thickened which somewhat reduces the performance benefit of using multiple alloys.

One approach used to overcome the assembly cost associated with a built-up spar is to machine the entire spar from a thick plate, extrusion or forging of one alloy. Sometimes, this machining operation is known as "hogging out" the part. With this design, the need for making web-to-upper spar and web-to-lower spar joints is eliminated. A one piece spar fabricated in this manner is sometimes known as an "integral spar". An ideal alloy for making integral spars should have the strength characteristics of an upper wing alloy combined with the fracture toughness and other damage tolerance characteristics of the lower wing alloy. Typically, achieving both properties simultaneously is difficult and requires a compromise between the property requirements for the upper skin and for the lower skin. One disadvantage that an integral spar must overcome is that the strength and toughness properties of a thick product used as the starting stock are typically less than those of thinner products typically used in a "built-up" spar even if the integral spar is made of the same alloy and temper. Thus, the compromise in properties and the use of thick products for an integral spar may result in a weight penalty. One thick product alloy which reasonably meets the property requirements of both an upper and lower spar cap and retains good properties even in thick products because of its low quench sensitivity, is alloy 7085 described in U.S. Pat. No. 6,972,110. Another disadvantage of integral spars, regardless of alloy, is the high ratio of buy weight (i.e., material which is purchased) to fly weight (i.e., weight of material flying on the aircraft) known as the "buy-to-fly." This at least partly diminishes the cost advantages of an integral spar over a built-up spar achieved through reduced assembly cost.

However, new technologies such as friction stir welding make further improvements in both weight and cost a possibility. A multi-component spar joined by friction stir welding or other advanced welding or joining methods combines the advantages of a built-up and integral spar. The use of such methods allows the use of use of products of lesser thickness as well as the use of multiple alloys, product forms and/or tempers which are optimized for each spar component. This expands the alloy product/temper options and improves the material buy-to-fly as in a built-up spar, while retaining a significant portion of the assembly cost advantage of an integral spar.

U.S. Pat. No. 5,865,911 describes a 7000 series alloy envisaged for use as lower wing skin structural members and for wing spar members of ultra-high capacity aircraft. This alloy exhibited improvements in strength, toughness, and fatigue resistance in thin plate form relative to incumbent lower wing alloys such as 2024 and 2324 (U.S. Pat. No. 4,294,625). Similar properties in strength and toughness have been obtained in alloy 7085 (U.S. Pat. No. 6,972,110) in thin plate form as shown in Table 1. Either of these alloys in thin product form would be useful for structural members of a lower wing cover and for the lower spar cap and web of a multi-component spar joined by mechanical fastening or welding. These alloys are also suitable for rib applications in either a built-up or integral design. However, the strength levels achievable in these alloys are typically insufficient for use in upper wing structural members of large commercial aircraft. Higher strength is also beneficial for the upper spar cap, spar web and for ribs provided adequate toughness is maintained.

TABLE 1

Properties of Miyasato alloy (U.S. Pat. No. 5,865,911) and 7085 (U.S. Pat. No. 6,972,110) in thin plate form.

| Property | Dir | Miyasato (1) | 7085 (2) |
|---|---|---|---|
| UTS (ksi) | L | 82.1 | 82.6 |
|  | LT | 81.4 | 82.2 |
| TYS (ksi) | L | 76.2 | 78.0 |
|  | LT | 75.4 | 77.2 |
| Klc, Kq (ksi√in) | L-T | 47.5 | 44.0 |
| RT | T-L | 40.7 | 35.9 |
| Klc, Kq (ksi√in) | L-T | 42.0 | 40.5 |
| −65 F. | T-L | na | 34.3 |
| Kapp (ksi√in) | L-T | 120.8 | 128.7 |
| RT | T-L | 94.3 | 104.4 |
| Kapp (ksi√in) | L-T | 115.5 | 106.8 |
| −65 F. | T-L | 74.7 | 79.0 |
| Kc (ksi√in) | L-T | 172.9 | 165.7 |
| RT | T-L | 123.9 | 129.1 |
| Kc (ksi√in) | L-T | 166.4 | 140.1 |
| −65 F. | T-L | 79.8 | 84.8 |

(1) U.S. Pat. No. 5,865,911: Rolled plate 1.2 inches thick, 86 inches wide
(2) 7085, U.S. Pat. No. 6,972,110; Rolled plate 1.5 inches thick, 102 inches wide Thus, a need exists for ultra-high capacity aircraft for an alloy that has significantly higher toughness than current alloys used in upper wing structural members while still maintaining an acceptable level of strength. Such an alloy would also be valuable for use in the upper spar cap and spar web of a multi-component spar joined by mechanical fastening or welding as well as for wing ribs of a built-up or integral design. While the needs of ultra-high capacity aircraft and wings have been specifically discussed such an alloy may also prove beneficial for use in fuselage applications and on smaller aircraft both in built-up and integral structures. In addition, non-aerospace parts such as armor for military vehicles may also be made from the instant alloy.

SUMMARY OF THE DISCLOSURE

New aluminum alloy products particularly well-suited for aerospace structural components are provided. In one aspect, the new aluminum alloys (sometimes referred to herein as the "instantly disclosed alloy") include from about 6.80 to about 8.5 wt. % Zn, about 1.5 or 1.55 to about 2.00 wt. % Mg, about 1.75 to about 2.30 wt. % Cu; about 0.05 to about 0.3 wt. % Zr, less than about 0.1 wt. % Mn, less than about 0.05 wt. % Cr, the balance substantially Al, incidental elements and impurities. The alloy products are about 4 inches thick or less, and sometimes about 2.5 or 2.0 inches thick or less having significantly higher fracture toughness than prior art alloys used for these applications while maintaining acceptable levels of strength, and vice-versa.

In one approach, an aluminum alloy product is provided. The aluminum alloy of the product consists essentially of from about 6.80 to about 8.5 wt. % Zn, about 1.5 or 1.55 to about 2.00 wt. % Mg, about 1.75 to about 2.30 wt. % Cu; about 0.05 to about 0.3 wt. % Zr, less than about 0.1 wt. % Mn, less than about 0.05 wt. % about Cr, the balance being aluminum, incidental elements and impurities. The aluminum alloy may exhibit, when solution heat treated, quenched and artificially aged, and in parts made from the products, an improved combination of strength and fracture toughness. In one embodiment, the alloy comprises low amounts of iron and silicon impurities. In one embodiment, the alloy includes not more than about 0.15 wt. % Fe and not more than about 0.12 wt. % Si impurities. In one embodiment, the alloy includes not more than about 0.08 wt. % Fe and not more than about 0.06 wt. % Si impurities. In one embodiment the alloy includes not more than about 0.04 wt. % Fe and not more than about 0.03 wt. % Si impurities. The aluminum may be in the form of rolled sheets, rolled plates, extrusions or forgings. In some embodiments, the alloy product is less than 2.5 or 2.0 inches thick at its thickest point. In some embodiments, the alloy product is from about 2.5 inches to 4 inches thick at its thickest point.

In one approach, the aluminum alloy is in the form of a rolled plate having a thickness of less than 2.5 inches, such as a thickness of not greater than 2.00 inches. In one embodiment, the aluminum alloy of the plate comprises 6.8-8.5 wt. % Zn, 1.5-2.0 wt. % Mg, 1.75-2.3 wt. % Cu, and up to 0.25 wt. % of at least one of Zr, Hf, Sc, Mn, and V, and up to about 89.95 wt. % aluminum. In one embodiment, the aluminum alloy comprises 7.5-8.5 wt. % Zn, 1.9-2.3 wt. % Cu, 1.5-2.0 wt. % Mg, up to 0.25 wt. % of at least one of Zr, Hf, Sc, Mn, and V, and up to about 89.1 wt. % aluminum. In one embodiment, the aluminum alloy comprises 7.8-8.5 wt. % Zn, 1.95-2.25 wt. % Cu, 1.7-2.0 wt. % Mg, up to 0.25 wt. % of at least one of Zr, Hf, Sc, Mn, and V, and up to about 88.55 wt. % aluminum. In one embodiment, the aluminum alloy comprises 7.9-8.2 wt. % Zn, 2.05-2.15 wt. % Cu, 1.75-1.85 wt. % Mg, up to 0.25 wt. % of at least one of Zr, Hf, Sc, Mn, and V, and up to about 88.3 wt. % aluminum. In one embodiment, the aluminum alloy comprises 7.4-8.0 wt. % Zn, 1.95-2.25 wt. % Cu, 1.7-2.0 wt. % Mg, up to 0.25 wt. % of at least one of Zr, Hf, Sc, Mn, and V, and up to about 88.95 wt. % aluminum. In one embodiment, the aluminum alloy comprises 7.5-7.9 wt. % Zn, 2.05-2.20 wt. % Cu, 1.8-1.9 wt. % Mg, up to 0.25 wt. % of at least one of Zr, Hf, Sc, Mn, and V, and up to about 88.65 wt. % aluminum. In various ones of these embodiments, the aluminum alloy may comprise from 0.05 to about 0.3 wt. % Zr, less than about 0.1 wt. % Mn, and less than about 0.05 wt. % Cr. In any of these embodiments, the aluminum alloy may consist essentially of the stated ingredients (aside from aluminum), the balance being aluminum and incidental elements and impurities. In any of these embodiments, the alloy product may be less than about 2.5 or 2.0 inches thick at its thickest point.

In one approach, the aluminum alloy is used in the form of a plate having a thickness of from 2.5 or 3.0 inches or 2.51 inches to about 3.5 inches, 3.75 inches or even 4 inches. In one embodiment, the aluminum alloy of the plate comprises 6.8-8.5 wt. % Zn, 1.5-2.0 wt. % Mg, 1.75-2.3 wt. % Cu, and up to 0.25 wt. % of at least one of Zr, Hf, Sc, Mn, and V, and up to about 89.95 wt. % aluminum. In one embodiment, the aluminum alloy comprises 7.4-8.0 wt. % Zn, 1.9-2.3 wt. % Cu, 1.55-2.0 wt. % Mg, up to 0.25 wt. % of at least one of Zr, Hf, Sc, Mn, and V, and up to about 89.15 wt. % aluminum. In one embodiment, the aluminum alloy comprises 7.5-7.9 wt. % Zn, 2.05-2.20 wt. % Cu, 1.6-1.75 wt. % Mg, up to 0.25 wt. % of at least one of Zr, Hf, Sc, Mn, and V, and up to about 88.55 wt. % aluminum. In various ones of these embodiments, the aluminum alloy may comprise from 0.05 to about 0.3 wt. % Zr, less than about 0.1 wt. % Mn, and less than about 0.05 wt. % Cr. In any of these embodiments, the aluminum alloy may consist essentially of the stated ingredients (aside from aluminum), the balance being aluminum and incidental elements and impurities.

The alloy product may realize improved strength and toughness properties. In one embodiment, the alloy product includes a section not more than about 2.5 inches or 2.00 inches in thickness and has a minimum tensile yield strength in the longitudinal direction and a plane-strain fracture toughness in the L-T direction at or above and to the right of line A-A in FIG. 3A or FIG. 3B (e.g., the shaded region). In one embodiment, the alloy includes a section not more than about 2.5 inches or 2.00 inches in thickness and having a tensile yield strength and an apparent plane stress fracture toughness in the L-T direction at or above and to the right of line B-B in FIG. 4 (e.g., the shaded region) when measured in a 16-inch wide center-cracked panel having an initial crack length (2ao) of about 4 inches and a thickness of about 0.25 inch.

In one embodiment, the alloy product includes a section of from about 2.00 or 2.5 inches to 3.0 or 3.125 or 3.25 inches in thickness and has a tensile yield strength in the LT (long traverse) direction and a plane-strain fracture toughness in the T-L direction at or above and to the right of line C-C in FIG. 7 (e.g., the shaded region). In one embodiment, the alloy product includes a section of from about 2.00 or 2.5 inches to 3.0 or 3.125 or 3.25 inches in thickness (e.g., at its thickest point) and has a tensile yield strength in the ST (short traverse) direction and a plane-strain fracture toughness in the S-L direction at or above and to the right of line E-E in FIG. 9 (e.g., the shaded region).

In one embodiment, the alloy product includes a section of from about 2.75, 3.0, 3.125 or 3.25 inches to about 3.5, 3.75 or 4 inches in thickness (e.g., at its thickest point) and has a minimum tensile yield strength in the LT direction and a plane-strain fracture toughness in the T-L direction at or above and to the right of line D-D in FIG. 8 (e.g., the shaded region). In one embodiment, the alloy product includes a section of from about 2.75, 3.0, 3.125 or 3.25 inches to about 3.5, 3.75 or 4 inches in thickness and has a minimum tensile yield strength in the ST direction and a plane-strain fracture toughness in the S-L direction at or above and to the right of line F-F in FIG. 10 (e.g., the shaded region).

The alloy product may also realize excellent corrosion resistance. In one embodiment, the alloy product of has an EXCO corrosion resistance rating of "EB" or better. In one embodiment, the alloy product consistently passes alternate immersion stress corrosion cracking resistance tests at a stress level of 35 ksi for a T74 temper, at a stress level of 25 ksi for a T76 temper, and at a stress level of 15 ksi for a T79 temper. In one embodiment, the alloy product consistently passes seacoast environment stress corrosion cracking resistance tests at a stress level of 35 ksi for a T74 temper, at a stress level of 25 ksi for a T76 temper, and at a stress level of 15 ksi for a T79 temper. In one embodiment, the alloy product consistently achieves an EXCO corrosion resistance rating of "EB" or better, and consistently passes both alternate immersion stress corrosion cracking resistance and a seacoast environment stress corrosion cracking resistance tests at a stress level of 35 ksi for a T74 temper, at a stress level of 25 ksi for a T76 temper, and at a stress level of 15 ksi for a T79 temper. In one embodiment, the alloy product consistently achieves an EXCO corrosion resistance rating of "EB" or better, and consistently passes both alternate immersion stress corrosion cracking resistance and seacoast environment stress corrosion cracking resistance tests at a stress level of 35 ksi for a T74 temper, at a stress level of 25 ksi for a T76 temper, and at a stress level of 15 ksi for a T79 temper, and achieves the above-described tensile yield strength and fracture toughness properties. The alloy product may pass other stress corrosion cracking resistance tests as well.

The alloy product may be utilized in a variety of applications. In one embodiment, the alloy product is an aerospace structural component. The aircraft structural component may be any of an upper wing panel (skin), an upper wing stringer, an upper wing cover with integral stringers, a spar cap, a spar web, a rib, rib feet or a rib web, stiffening elements and combinations thereof. In one embodiment, the alloy product is a fuselage component (e.g., a fuselage skin). In one embodiment, the alloy product is an armor component (e.g., of a motorized vehicle). In one embodiment, the alloy product is used in the oil and gas industry (e.g., as pipes, structural components).

The alloy products may be produced by a variety of methods. For example, the component may be made from an alloy product that is welded by fusion or solid state methods to one or more aluminum alloy products made of substantially the same alloy of the same or different temper to make the component. In one embodiment, the alloy product is joined to one or more aluminum alloy products of different alloy composition to make a multi-alloy component. In one embodiment, the product is joined by mechanical fastening. In one embodiment, the alloy product is joined by fusion or solid state welding methods. In one embodiment, the alloy product is age formed either alone or after joining to other alloy products in the process of making a component. In one embodiment, the alloy product is reinforced by fiber metal laminates or other reinforcing materials.

Methods of producing aluminum alloys and aluminum alloy products are also provided. In one approach, a method includes the steps of forming or shaping an aluminum alloy into an aircraft structural component. The method may include producing or providing an aluminum alloy, such as an aluminum alloy having any of the aforementioned compositions, homogenizing and hot working the alloy by one or more methods selected from the group consisting of rolling, extruding and forging, solution heat treating the alloy, quenching the alloy, and stress relieving the alloy. The structural component in an artificially aged condition may exhibit an improved combination of strength and fracture toughness. In one embodiment, the alloy is less than about 4 inches thick when quenched. In one embodiment, the method includes age forming the component either alone or after joining to other components.

In one embodiment, the forming or shaping of the structural component step includes machining. In one embodiment, the machining is performed after artificially aging or between one of the aging stages. In one embodiment, the machining is performed prior to solution heat treatment.

In one embodiment, the shaping or forming of the structural component step includes age forming either before or after joining to other components. In one embodiment, at least some of the forming or shaping of the structural component step is performed before or during at least some of the artificial aging.

In one embodiment, the alloy is artificially aged by a method comprising (i) a first aging stage within about 150 to about 275° F., and (ii) a second aging stage within about 290 to about 335° F. In one embodiment, the first aging stage (i) proceeds within about 200 to about 260° F. In one embodiment, the first aging stage (i) proceeds for about 2 to about 18 hours. In one embodiment, the second aging stage proceeds for about 4 to about 30 hours within about 290 to about 325° F. In one embodiment, the second aging stage (ii) proceeds for about 6 to about 30 hours within about 290 to about 315° F. In one embodiment, the second aging stage (ii) proceeds for about 7 to about 26 hours within about 300 to about 325° F. In one embodiment, one or both of the aging stages includes an integration of multiple temperature aging effects. In one embodiment, one or both of the aging stages is interrupted in order to weld the part to another component of the same or a different alloy or temper.

In another embodiment, the alloy is artificially aged by a method comprising (i) a first aging stage within about 290 to about 335° F., and (ii) a second aging stage within about 200 to about 275° F. In one embodiment, the first aging stage (i) proceeds for about 4 to about 30 hours within about 290 to about 325° F. In one embodiment, the first aging stage (ii) proceeds for about 6 to about 30 hours within about 290 to about 315° F. In one embodiment, the first aging stage (i) proceeds for about 7 to about 26 hours within about 300 to about 325° F. In one embodiment, one or both of the aging stages includes an integration of multiple temperature aging effects. In one embodiment, one or both of the aging stages is interrupted in order to weld the part to another component of the same or a different alloy or temper.

In another embodiment, the alloy is artificially aged by a method comprising (i) a first aging stage within about 150 to about 275° F., (ii) a second aging stage within about 290 to about 335° F., and (iii) a third aging stage within about 200 to about 275° F. In one embodiment, the first aging stage (i) proceeds within about 200 to about 260° F. In one embodiment, the first aging stage (i) proceeds for about 2 to about 18 hours. In one embodiment, the second aging stage (ii) proceeds for about 4 to about 30 hours within about 290 to about 325° F. In one embodiment, the second aging stage (ii) proceeds for about 6 to about 30 hours within about 290 to about 315° F. In one embodiment, the second aging stage (ii) proceeds for about 7 to about 26 hours within about 300 to about 325° F. In one embodiment, the third aging stage (iii) proceeds for at least about 2 hours within about 230 to about 260° F. In one embodiment, the third aging stage (iii) proceeds for about 18 hours or more within about 240 to about 255° F. In one embodiment, one, two or all of the aging stages includes an integration of multiple temperature aging effects. In one embodiment, one, two or all of the aging stages is interrupted in order to weld the part to another component of the same or a different alloy or temper.

The method(s) may include joining alloy components. In one embodiment, one or more of the components are joined by mechanical fastening. In one embodiment, one or more of the components are joined by welding. In one embodiment, the components are welded by electron beam welding. In one embodiment, the components are welded by friction stir welding. In one embodiment, a component is fastened or welded to another aluminum product to make a multi-alloy and/or multi-temper component.

As may be appreciated, various ones of the above-noted aspects, approaches and/or embodiments may be combined to yield various useful aluminum alloy products and components. These and other aspects, advantages, and novel features of the disclosure are set forth in part in the description that follows and will become apparent to those skilled in the art upon examination of the following description and figures, or may be learned by practicing the disclosure.

BRIEF DESCRIPTION OF THE DRAWINGS

For a fuller understanding of the instant disclosure, reference is made to the following description taken in connection with the accompanying drawing(s), in which:

FIGS. 2C-1, 2C-2, 2D-1, and 2D-2 illustrate various embodiments of the alloy composition of the present disclosure, such as compositions useful for producing aluminum alloy plates having a thickness of not greater than 2 or 2.5 inches;

FIGS. 2E and 2F illustrate various embodiments of the alloy composition of the present disclosure, such as compositions useful for producing aluminum alloy plates having a thickness of at least about 2 or 2.5 inches;

FIG. 10 is a graph illustrating typical S-L plane strain fracture toughness $K_{Ic}$ versus typical ST tensile yield strengths of plates of (i) example alloy F (having a thickness of 4.0 inches) and of a T74 temper, and (ii) several other conventional alloys (having a thickness of about 4 inches).

Like reference characters denote like elements throughout the drawings.

DETAILED DESCRIPTION

Figure 1:
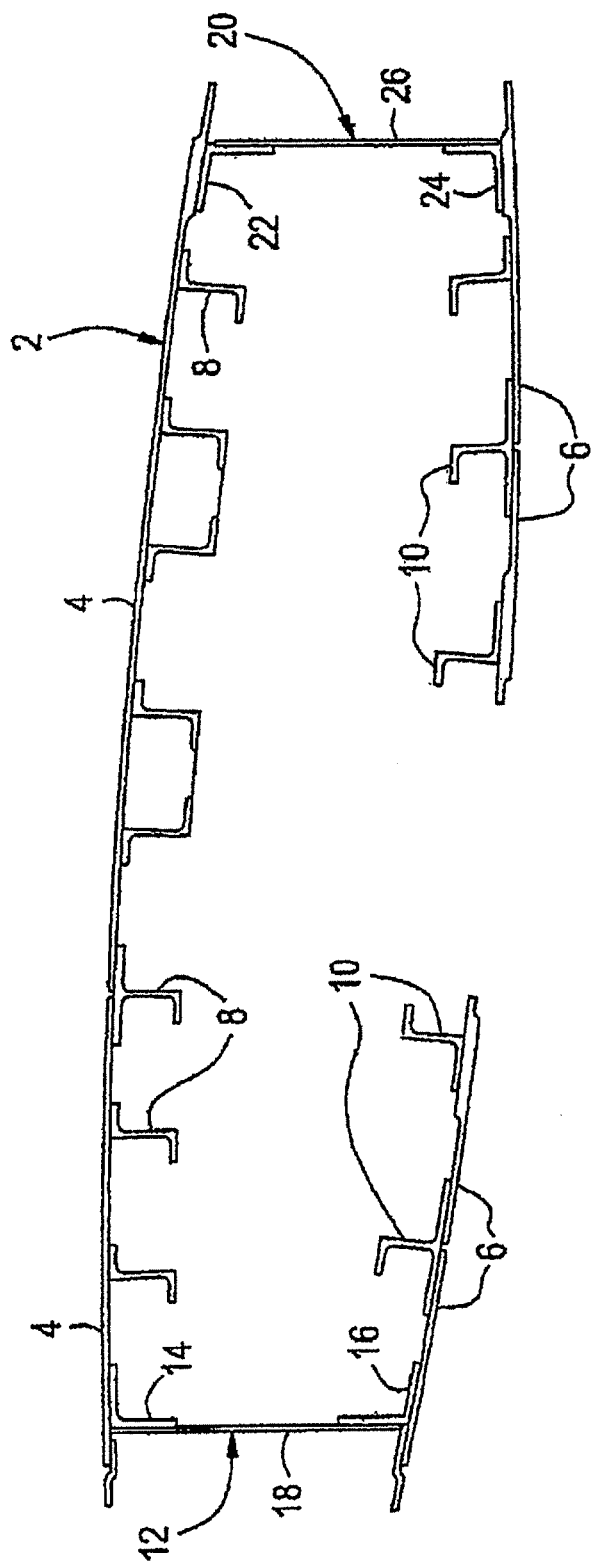
FIG. 1 is a transverse cross-sectional view of a typical wing box construction of an aircraft wing.

FIG. 1 is a schematic illustrating a transverse cross-sectional view of typical wing box construction 2 comprising upper wing skin 4 and stringers 8, lower wing skin 6 and stringers 10, spaced by spars 12 and 20. Stringers 4 and 10 can be attached separately by fastening or made integral with the skin to eliminate the need for separate stringers and rivets. Typically, two, three or four wing panels 4 or 6 are needed to cover each of the wing upper and lower surfaces depending on aircraft size and wing design. Even more panels may be required for an integral skin and stringer design. The multiple panels comprising the upper and lower skin are typically joined by mechanical fastening. These joints add weight to the aircraft.

The spars may be of a "built-up" design comprised of upper spar cap 14 or 22, lower spar cap 16 or 24 and web 18 or 26 joined by mechanical fastening or they may be of integral one-piece design, each type of design having its own advantages and disadvantages. A built-up spar allows for optimal alloy products to be used for each of the spar components and has improved "buy-to-fly" compared to an integral spar. Typically, the upper spar cap requires high compressive strength while the lower spar caps requires less strength but higher damage tolerance properties such as fracture toughness and fatigue crack growth resistance. An integral spar has much lower assembly costs but its performance may be less than for a built-up design since its properties are necessarily a compromise between the requirements for the upper skin and lower skin. Also, strength and toughness of a thick product used as a starting stock for an integral spar are typically less those of thinner products used for a built-up spar.

The wing box also includes ribs (not shown) which extend generally from one spar to the other. These ribs lie parallel to the plane of FIG. 1 whereas the wing skins and spars run perpendicular to said FIG. 1 plane. Like spars, the ribs can also be of a built-up or integral design with each type having similar advantages or disadvantages as in spars. However, the optimum properties in ribs differ somewhat with high strength being advantageous for rib feet which connect to the upper and lower wing skin and stringers and higher stiffness being advantageous for the web of the rib. More typically, wing ribs are of an integral design with a compromise in properties between the requirements for the rib feet and rib web.

New welding technologies such as friction stir welding and electron beam welding allows for new structural concepts retaining the advantages of current built-up and integral designs while minimizing their disadvantages. For example, the different wing panels 4 used to make the upper skin can be joined by friction stir welding instead of a mechanically fastened joint thereby reducing the weight of the upper skin. Spars and ribs can be made from multiple alloys, tempers and/or products optimized for each spar or rib component joined by friction stir welding, thereby retaining the performance advantage and better buy-to-fly of thinner products as in a built-up spar while reducing assembly costs like an integral spar or rib. For example, upper spar caps 14 and 22 could be made from a high strength alloy or temper extrusion, lower spar caps 16 and 24 from a lower strength damage tolerance alloy or temper extrusion, and the spar webs 18 and 26 from a moderate strength alloy or temper plate, the three components joined by friction stir welding or electron beam welding. Designs containing a mixture of integral and built-up design could be utilized to improve the fail safety and damage tolerance of a component while reducing assembly cost. For example, the upper spar caps 14 and 22 could be joined by friction stir welding to the spar webs 12 and 20 to reduce assembly costs while the lower spar caps 16 and 24 could be mechanically fastened to improve damage tolerance. Further improvements in damage tolerance in built-up, integral welded and structures containing a mixture of both could be achieved by reinforcement with fiber metal laminates and other reinforcing materials as described in U.S. Pat. No. 6,595,467.

The alloy described in U.S. Pat. No. 6,972,110, which has the commercial designation 7085, is primarily directed at thicker gauges, generally from 4 to 8 inches or greater where low quench sensitivity is important. Low quench sensitivity is achieved by providing a carefully controlled composition which permits quenching thicker gauges while still achieving superior combinations of high strength and toughness and corrosion resistance compared to previous thick product alloys such as 7050, 7010 and 7040. The careful composition registered as AA7085 includes low Cu (about 1.3 to about 1.9 wt. %) and low Mg levels (about 1.3 to about 1.68 wt. %), which are among the leanest levels used for commercial aerospace alloys. The Zn levels (about 7 to about 9.5 wt. %) at which the properties were most optimized corresponded to levels much higher than those specified for 7050, 7010 and 7040. This was against past teachings that higher Zn content increases quench sensitivity. On the contrary, the higher Zn levels in 7085 were actually proven to be beneficial against the slow quench conditions of thick sectioned pieces. U.S. Pat. No. 6,972,110 teaches that a good portion of the improved strength and toughness for thick sections of its instant alloy are due to the specific combination of alloying ingredients.

U.S. Pat. No. 5,221,377 pertains to the 7055 alloy, which is typically used for plate and extrusions 2 inches thick or less, and teaches that reducing Mg levels results in improved fracture toughness. It is also widely appreciated in the prior art that increasing strength through increased solute content typically results in a reduction in toughness.

Figure 2A:
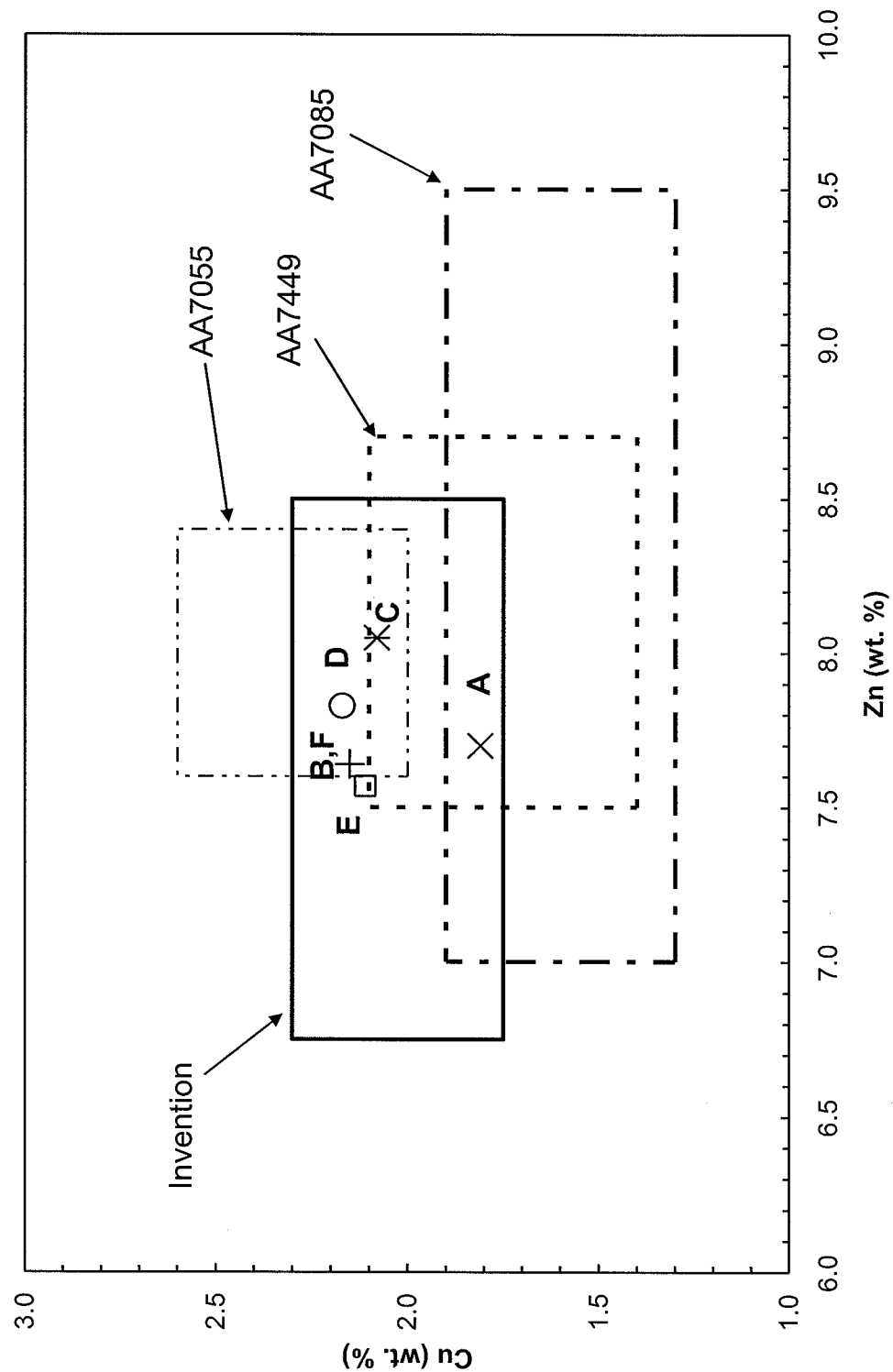
FIGS. 2A and 2B illustrate embodiments of the instant alloy composition in terms of the major alloying elements Cu and Zn and Mg and Zn and as compared to compositions of 7085 and 7055 and 7449 alloy families, respectively.
Figure 2B:
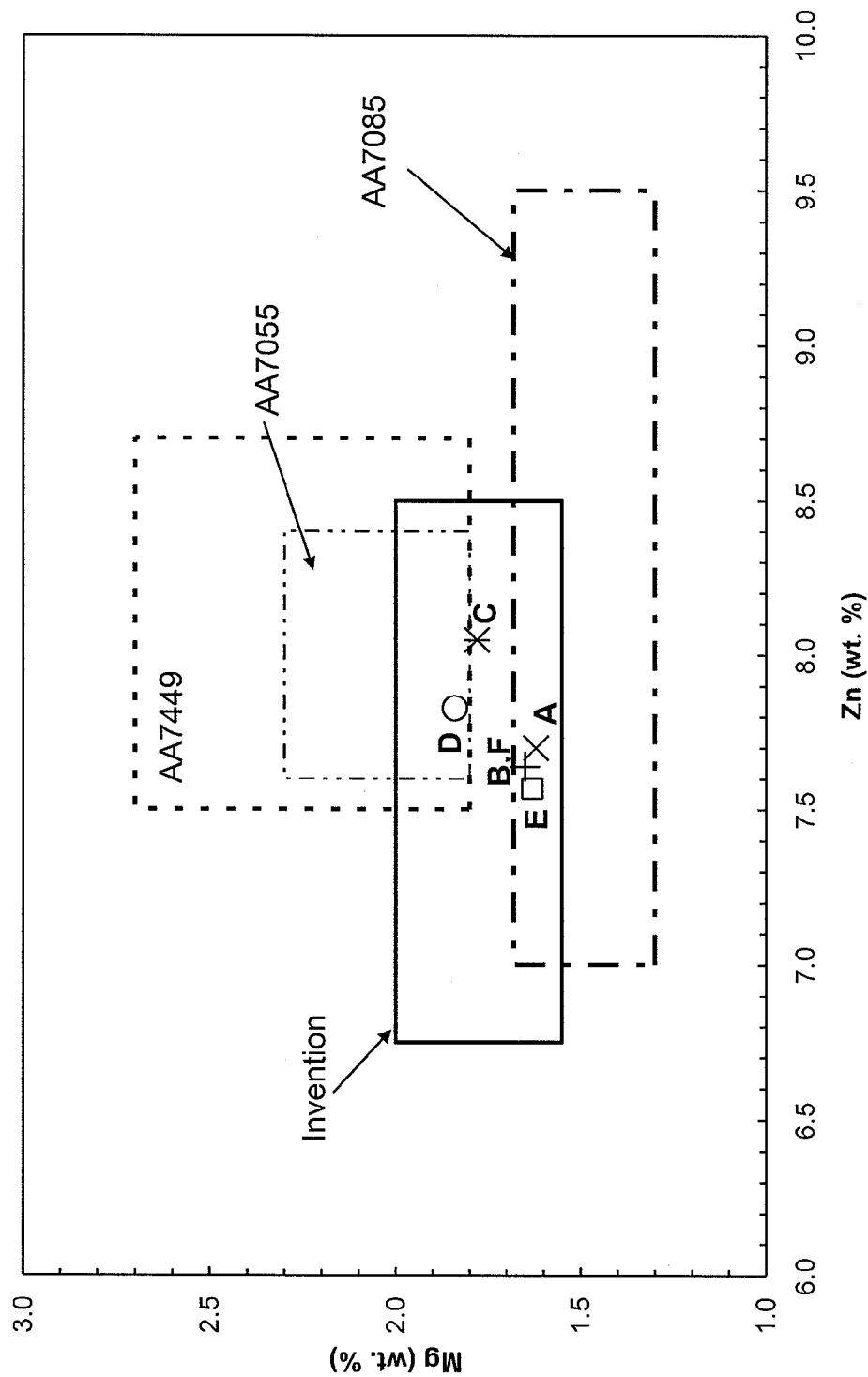

The instant alloy is primarily directed at thinner alloy products, about 4 inches thick or less, and sometimes about 2.0 or 2.5 inches thick or less, for upper wing structural members of large commercial aircraft including wing skins, wing stringers and upper spar caps. These applications will benefit from and in many cases would require higher strength than can be achieved by the 7085 composition. Likewise, higher strength may be beneficial in other applications such as spar webs, ribs and other aerospace components. In order to increase strength, the Mg range of the instantly disclosed alloys is increased to about 1.5 or 1.55 to about 2.0 wt. % and the Cu range from about 1.75 to about 2.30 wt. %. The Zn range is lowered somewhat to about 6.8 to about 8.5 wt. %. FIGS. 2A and 2B illustrate embodiments of the instant alloy composition in terms of the major alloying elements Cu and Zn and Mg and Zn and as compared to compositions of 7085 (U.S. Pat. No. 6,972,110) and 7055 (U.S. Pat. No. 5,221,377) and 7449. Suitable compositions of the instantly disclosed alloy are designated by a rectangular box with solid lines. The compositions of example alloys A-F, described below, are also included in FIGS. 2A and 2B.

Figures 1, 2C:
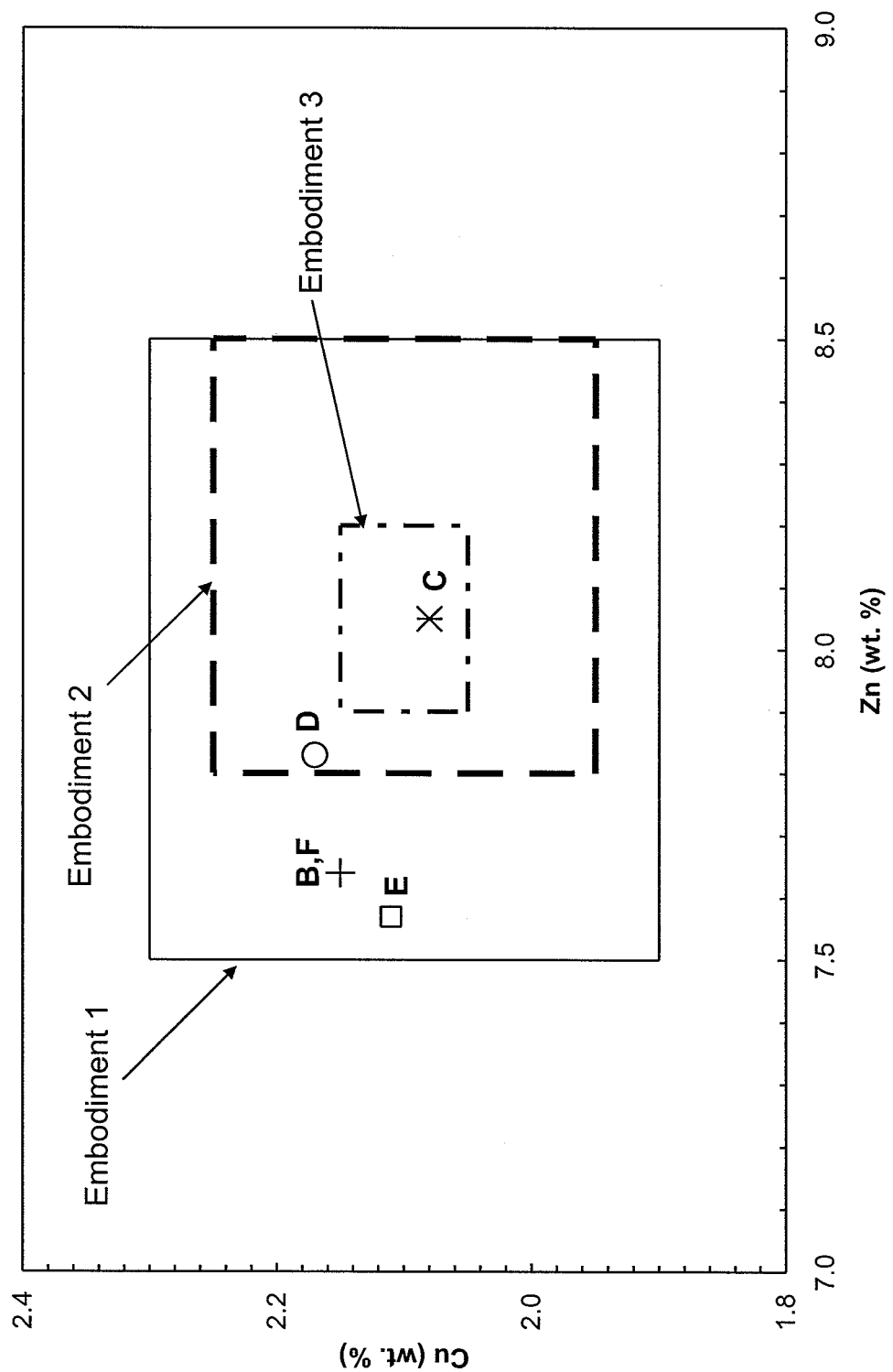
Figures 2, 2C:
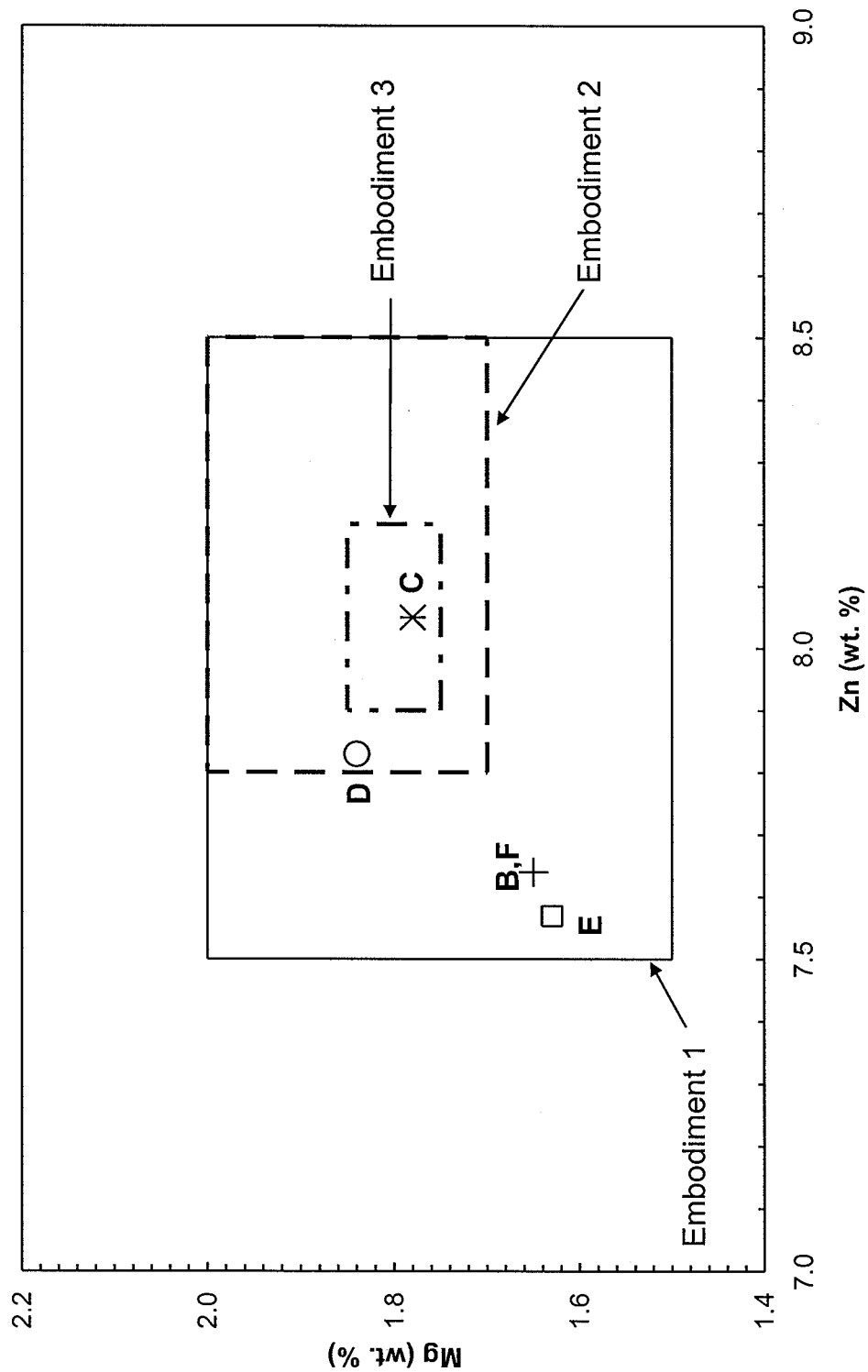
Figures 1, 2D:
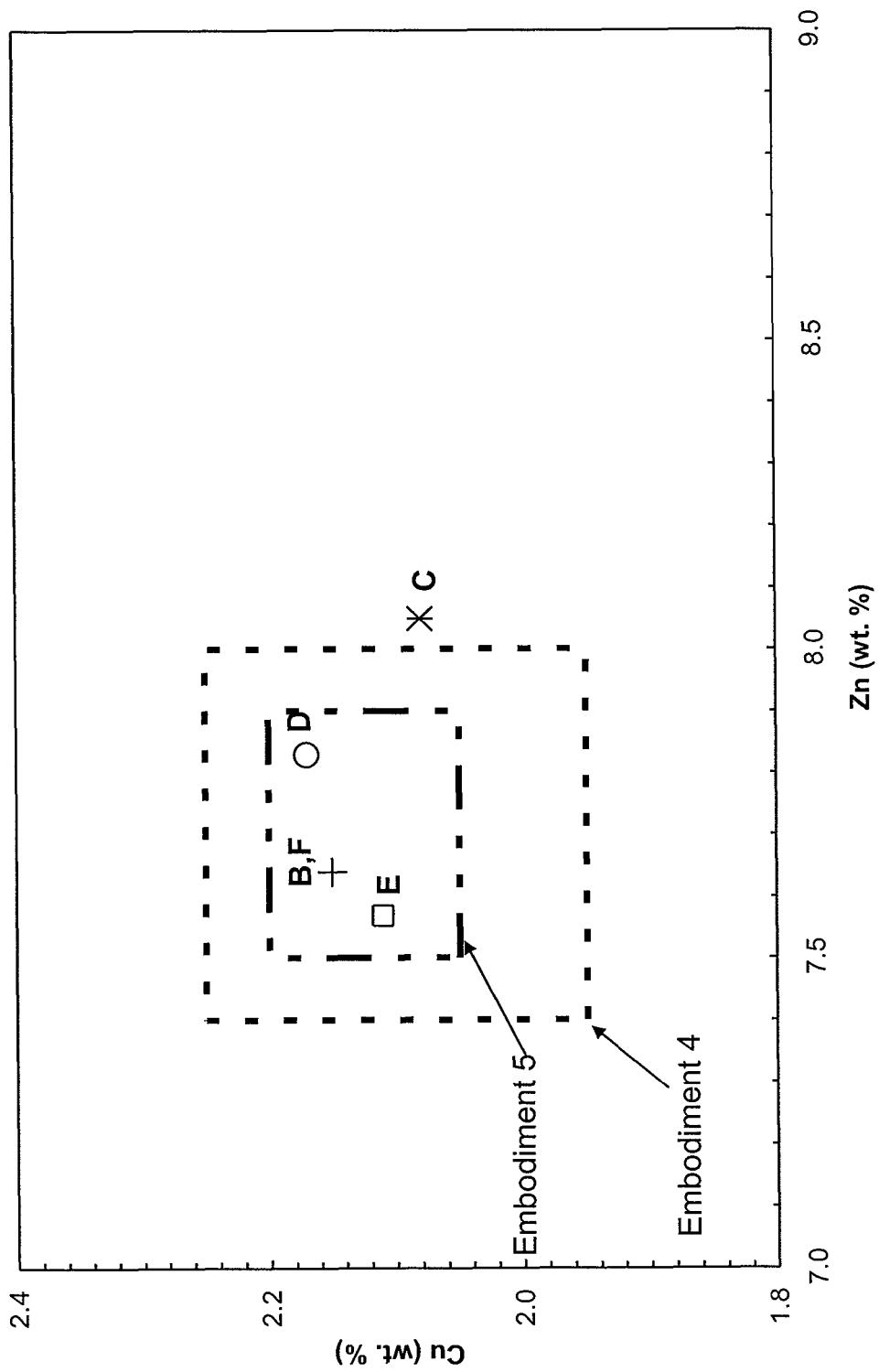
Figures 2, 2D:
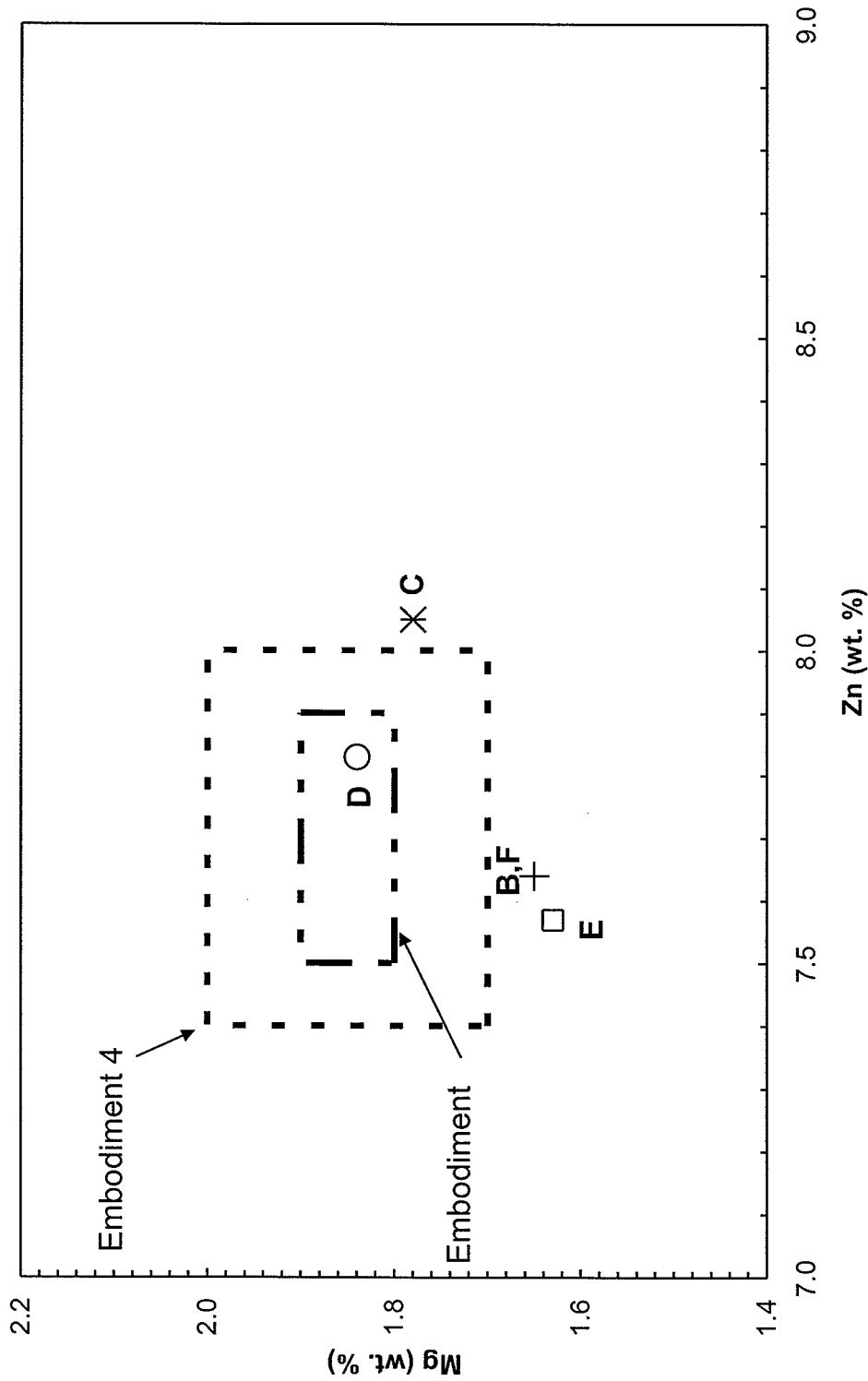

In one approach, the instantly disclosed alloys are in the form of a plate having a thickness of less than 2.5 inches, such as a thickness of not greater than 2.00 inches. In one embodiment, the aluminum alloy of the plate comprises 6.8-8.5 wt. % Zn, 1.5-2.0 wt. % Mg, 1.75-2.3 wt. % Cu, and up to 0.25 wt. % of at least one of Zr, Hf, Sc, Mn, and V, and up to about 89.95 wt. % aluminum (e.g., as illustrated in FIGS. 2A and 2B). In other embodiments, and with reference to FIGS. 2C-1, 2C-2, 2D-1, and 2D-2, the aluminum alloy comprises 7.5-8.5 wt. % Zn, 1.9-2.3 wt. % Cu, 1.5-2.0 wt. % Mg, up to 0.25 wt. % of at least one of Zr, Hf, Sc, Mn, and V, and up to about 89.1 wt. % aluminum (as provided by embodiment 1 of FIGS. 2C-1 and 2C-2). In another embodiment, the aluminum alloy comprises 7.8-8.5 wt. % Zn, 1.95-2.25 wt. % Cu, 1.7-2.0 wt. % Mg, up to 0.25 wt. % of at least one of Zr, Hf, Sc, Mn, and V, and up to about 88.55 wt. % aluminum (as provided by embodiment 2 of FIGS. 2C-1 and 2C-2). In one embodiment, the aluminum alloy comprises 7.9-8.2 wt. % Zn, 2.05-2.15 wt. % Cu, 1.75-1.85 wt. % Mg, up to 0.25 wt. % of at least one of Zr, Hf, Sc, Mn, and V, and up to about 88.3 wt. % aluminum (as provided by embodiment 3 of FIGS. 2C-1 and 2C-2. In one embodiment, the aluminum alloy comprises 7.4-8.0 wt. % Zn, 1.95-2.25 wt. % Cu, 1.7-2.0 wt. % Mg, up to 0.25 wt. % of at least one of Zr, Hf, Sc, Mn, and V, and up to about 88.95 wt. % aluminum (as provided by embodiment 4 of FIGS. 2D-1 and 2D-2). In one embodiment, the aluminum alloy comprises 7.5-7.9 wt. % Zn, 2.05-2.20 wt. % Cu, 1.8-1.9 wt. % Mg, up to 0.25 wt. % of at least one of Zr, Hf, Sc, Mn, and V, and up to about 88.65 wt. % aluminum (as provided by embodiment 5 of FIGS. 2D-1 and 2D-2). In various ones of these embodiments, the aluminum alloy may comprise from 0.05 to about 0.3 wt. % Zr, less than about 0.1 wt. % Mn, less than about 0.05 wt. % Cr. In any of these embodiments, the aluminum alloy may consist essentially of the stated ingredients (aside from aluminum), the balance being aluminum and incidental elements and impurities.

Figure 2F:
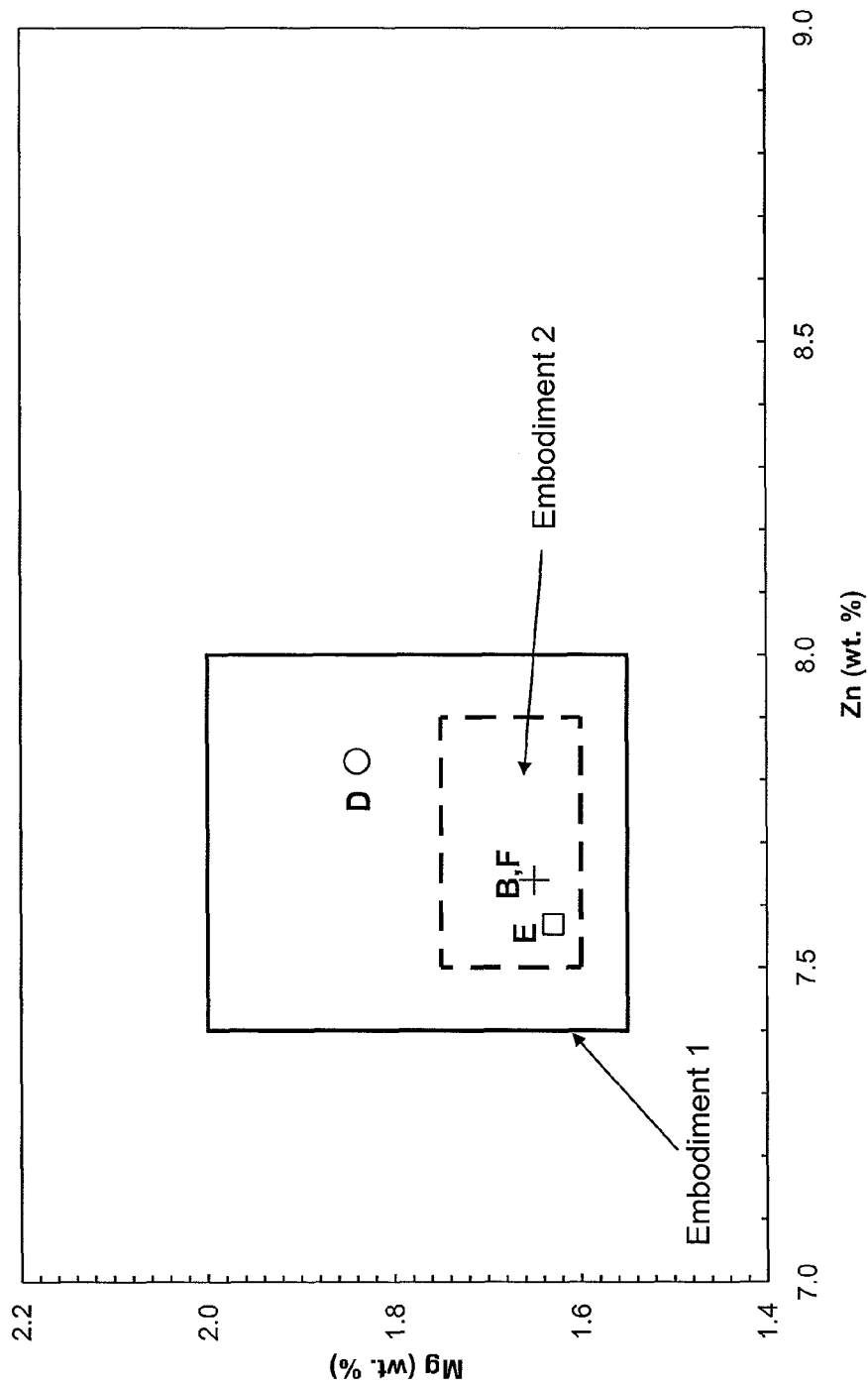

In another approach, the aluminum alloy is used in a plate having a thickness of from about 2.01 inches or 2.51 inches to about 3.5 inches, 3.75 inches or even 4 inches. In one embodiment, the aluminum alloy of the plate comprises 6.8-8.5 wt. % Zn, 1.5-2.0 wt. % Mg, 1.75-2.3 wt. % Cu, and up to 0.25 wt. % of at least one of Zr, Hf, Sc, Mn, and V, and up to about 89.95 wt. % aluminum (e.g., as illustrated in FIGS. 2A and 2B). In other embodiments, and with reference to FIGS. 2E and 2F, the aluminum alloy comprises 7.4-8.0 wt. % Zn, 1.9-2.3 wt. % Cu, 1.55-2.0 wt. % Mg, up to 0.25 wt. % of at least one of Zr, Hf, Sc, Mn, and V, and up to about 89.15 wt. % aluminum (as provided by embodiment 1 of FIGS. 2E and 2F). In one embodiment, the aluminum alloy comprises 7.5-7.9 wt. % Zn, 2.05-2.20 wt. % Cu, 1.6-1.75 wt. % Mg, up to 0.25 wt. % of at least one of Zr, Hf, Sc, Mn, and V, and up to about 88.55 wt. % aluminum (as provided by embodiment 2 of FIGS. 2E and 2F). In various ones of these embodiments, the aluminum alloy may comprise from 0.05 to about 0.3 wt. % Zr, less than about 0.1 wt. % Mn, less than about 0.05 wt. % Cr. In any of these embodiments, the aluminum alloy may consist essentially of the stated ingredients (aside from aluminum), the balance being aluminum and incidental elements and impurities.

From the teachings of U.S. Pat. No. 6,972,110, the composition changes in the instantly disclosed alloys would increase the quench sensitivity of the alloy somewhat in comparison to alloy 7085 and this is quite possibly the case. However, the instantly disclosed alloys likely retains some of the benefit of the 7085 composition, and in any case, quench sensitivity is less of a concern in the thinner alloy products at which the instantly disclosed alloys are directed. The changes in composition were also expected to have a detrimental influence on fracture toughness both because of the resulting increase in strength and the higher Mg content. With the Mg range between that of 7085 and existing upper wing alloys 7055 and 7449, it was believed that the strength and toughness of the instantly disclosed alloys would fall between these alloys. This was indeed the case for strength. However, the combination of strength and fracture toughness of the instantly disclosed alloys were improved not over only 7055 and 7449 as expected, but, quite surprisingly it was also improved over the 7085 alloy. Thus, the instantly disclosed alloys identify an unexpected "sweet" composition region that offers higher combinations of strength and fracture toughness than exhibited by the incumbent alloys.

The alloy products of the present disclosure can be prepared by more or less conventional practices including melting and direct chill (DC) casting into ingot form and exhibit internal structure features characteristic of ingot derivation. Conventional grain refiners such as those containing titanium and boron, or titanium and carbon, may also be used as is well-known in the art. Once an ingot has been cast from this composition, it is scalped (if needed) and homogenized by heating to one or more temperatures between about 800° and about 900° F., or between about 850° to about 900° F. After homogenization, these ingots are worked by, for example, rolling into plate or sheet or extruding or forging into special shaped sections. For most aerospace applications, alloy products made from the instantly disclosed composition have a cross-sectional thickness of about 4, 3.75 or 3.5 inches thick or less, and sometimes about 2.5 or 2.0 inches thick or less. The product, if desired, should then be solution heat treated by heating to one or more temperatures between about 850° and about 900° F. to take substantial portions, sometimes all or substantially all, of the soluble zinc, magnesium and copper into solution, it being understood that with physical processes that are not always perfect, probably every last vestige of these main alloying ingredients will not be dissolved during solution heat treatment. After heating to elevated temperatures, as described, the product should be rapidly cooled or quenched to complete the solution heat treatment procedure. Such cooling is typically accomplished by immersion in a suitably sized tank of cold water or by water sprays. Air chilling may also be used as a supplementary or substitute cooling means. After quenching, certain products may need to be mechanically stress relieved such as by stretching and/or compression up to about 8%, for example from about 1% to about 3%.

A solution heat treated and quenched product, with or without cold working, is then considered to be in a precipitation-hardenable condition, or ready for artificial aging. The practice may be two-step or three-step practice and for some applications even a single step practice may suffice. However, clear lines of demarcation may not exist between each step or phase. It is generally known that ramping up and/or down from given (or target) treatment temperatures, in itself, can produce precipitation (aging) effects which can, and often need to be, taken into account by integrating such ramping conditions, and their precipitation hardening effects, into the total aging treatment program. Such integration was described in greater detail in U.S. Pat. No. 3,645,804, the disclosure of which is fully incorporated by reference herein.

U.S. Pat. No. 6,972,110, the disclosure of which is fully incorporated by reference herein, describes a three (3)-step aging practice for the 7085 alloy. A 3-step aging practice with the same or similar temperature ranges to that disclosed in the '110 patent may also be used with the instantly disclosed alloy, but a 2-step practice is also suitable for some of the principal applications envisioned. The 2-step practice can be either the low temperature step followed by the high temperature step, or vice-versa. For example, a 2-step practice is often utilized for upper wing skins and stringers. These components are often age formed by the aircraft manufacturer to obtain the contour of the wing. During age forming, the part is constrained in a die at an elevated temperature usually between about 250 and about 400° F. for several to tens of hours, and the desired contour are accomplished through creep and stress relaxation processes. The age forming is often accomplished in conjunction with the artificial aging treatment, especially during the high temperature step at which creep occurs most rapidly. The age forming is typically done in an autoclave furnace. The autoclave and dies required to age form an aircraft wing panel for a large commercial aircraft are large and expensive and as a result few are employed in the manufacturing process. Thus, it is desirable that the age forming cycle be as short as practicable while still achieving the required contour and properties in the alloy product so that production throughput is maximized. A shortening of the third step or its complete elimination is beneficial in achieving this goal. In a low-high 2-step practice the first step can be applied by the alloy producer, further minimizing the time expended in the age forming process.

The results of SCC studies on the example alloys indicate that the third step can indeed be shortened and even eliminated while meeting the SCC requirements for upper wing skin and stringers. The 3-step practice for 7085 alloys in thick product applications is generally unnecessary for the instantly disclosed alloys in upper wing and other high strength applications for several reasons. For instance, the SCC requirements for upper wing components are less stringent than those for a thick product application such as a rib or spar. The upper wing components are predominantly subjected to compressive stresses while the spar, in particular the lower portion, is subjected to tensile stresses. Only tensile stresses contribute to SCC. Also, an integral spar or rib machined from a thick product can have significant design stresses in the ST direction. For example, the spar caps of an integral spar made from plate are in the L-ST plane of the parent plate. In comparison, the principal design stresses in the upper skin and stringer are predominantly in the L-LT plane, which is less prone to SCC. As a result of these differences, the minimum SCC requirement in the ST direction for the incumbent upper wing alloys 7055 and 7449 is 15 or 16 ksi allowing these alloys to be used in the high strength −T79 temper while thick products for spars, ribs and other applications are typically used in the lower strength −T76 and −T74 tempers which typically have SCC minimums of 25 ksi and 35 ksi, respectively.

The instantly disclosed alloys are also envisaged for use in a multi-component, multi-alloy spar or rib joined by mechanical fastening or welding. As already described, these applications will likely have higher SCC requirements than for upper wing skin and stringers. However, in a multi-component spar made up of thinner products, the grain structure can be more favorably oriented for SCC resistance than for an integral spar machined from thick plate. The spar caps, for example, can be machined from the more SCC resistant L-LT plane of a parent plate or extrusion instead of the L-ST plane. The minimum SCC performance in the L and LT directions is typically greater than 40 ksi, even in the less SCC resistant high strength tempers, compared to 25 ksi or 35 ksi in the ST direction for the lower strength, higher SCC resistant tempers. Thus, it may be the case that the 3rd step aging practice often utilized for 7085 alloys can also be shortened or eliminated for the instantly disclosed alloys even for spar, rib and other applications having more demanding SCC requirements. Shortening or elimination of the third step does result in a small strength reduction, typically about 1 to about 2 ksi.

However, it may be the case that this strength reduction can be compensated for by the use of higher strength tempers not practicable in thick products. Even so, for some built-up, integral or multi-component applications of the present disclosure, lower strength tempers such as the −T74 or −T73 may be desirable, either for the additional corrosion resistance provided or for additional improvements in fracture toughness.

In the case of multi-alloy spar or rib joined by welding, the flexibility in the aging practice exhibited by the instantly disclosed alloys is a desirable characteristic. The welding, either by fusion welding methods or solid state methods such as friction stir welding, may be performed in an intermediate temper instead of in the final alloy temper as post weld aging is typically desirable to improve the strength and corrosion properties of the weld. For example, the welding of the instantly disclosed alloys to another alloy having strength and damage tolerance properties more suitable for the lower spar cap, could be performed after the application of the first aging step of either a 2- or 3-step practice in the instantly disclosed alloy. The other alloy could be another 7XXX alloy or quite different in composition, for example an aluminum-lithium alloy in accordance with U.S. Pat. No. 4,961,792, and will have its own typical aging practice which may be comprised of one, two or three steps. Since the post-weld aging of the two joined alloy products must necessarily occur together, the aging practice for the instantly disclosed alloys may need to be two or three steps depending on the aging requirements of the alloy to which it is joined. Thus, the flexibility of the instantly disclosed alloys with respect to the number of aging steps and times that can be successfully utilized is beneficial for welded multi-alloy components. Even so, some compromises to the typical aging practice for each alloy may be required depending on the specific alloys involved.

The manufacture and aging of a multi-alloy component utilizing the instantly disclosed alloys joined by welding could be somewhat simplified by using 7XXX alloys with similar compositions to the instantly disclosed alloys, but that are leaner or richer in alloying elements added for strengthening to achieve the desired balance of strength and toughness in each component. The typical pre- and post-weld aging practices for such alloys would likely be more compatible than for more dissimilar alloys requiring fewer adjustments to their typical practices. Alternatively, the desired differences in strength and toughness could likely be achieved in some cases with the use of the instantly disclosed alloys alone by employing different tempers. For example, a multi-temper spar solely made from the instantly disclosed alloys could use a the high strength −T79 temper in the upper cap, the moderate strength, higher toughness −T76 temper in the spar web, and the lower strength, highest toughness −T73 temper in the lower spar cap. Typically, the aging times for the −T76 and −T73 would be greater than for the −T79 temper. In a welded multi-temper spar, the pre-weld aging for the −T79 upper spar could be, for example, comprised of a first step only, the −T76 spar web comprised of a first step and a portion of the second step and the −T73 lower spar cap of a first step and a larger portion of the second step. This could be carried out separately on each component or by staggering their removal from the same furnace. Once welded, the same post weld aging practice would be used on the joined components. With the appropriate selection of the pre- and post-weld aging practice the typical aging practice can be applied to each component essentially without compromise.

Example 1

Ingots A-D having compositions similar to the embodiments described above for the instant alloy family were cast as large commercial scale ingots. In addition, one ingot of aluminum alloy 7085 was cast as a control. The ingots were scalped and homogenized with a final soak temperature of about 870° to about 900° F. One ingot each of alloys A and B was hot rolled to plate having a thickness of 1.07 inches and a width of 135 inches. Another ingot each of alloys A and B was hot rolled to a plate having a thickness of 1.10 inches and width of 111 inches. The former will be hereafter referred to as Plate 1 and the latter as Plate 2. One ingot each of alloys C and D was hot rolled to the same thickness and width as Plate 2. Plate 1 and Plate 2 sizes are representative of upper wing panels of an ultra-large capacity aircraft. The 7085 control alloy was hot rolled to the same thickness and width as Plate 1. The plates were solution heat treated between about 880° to about 895° F. for about 70-100 minutes, water spray quenched to ambient temperature, and cold stretched about 1.5 to about 3%. Samples from the plates of alloys A thru D and the 7085 control were aged to a high strength T79-type temper suitable for upper wing components using a conventional three-step aging practice (e.g., as provided by U.S. Pat. No. 6,972,110). The three-step practice consisted of a first step of about 6 hours at about 250° F., a second step of about 7 hours at about 308° F. and a third step of about 24 hours at about 250° F. In addition, samples of an improved version of aluminum alloy 7055 (U.S. Pat. No. 7,097,719) were cut from a number of different production lots of plate of the same or similar width and thickness and given the high strength T7951 temper and several overaging tempering treatments to decrease the strength level and increase fracture toughness. The composition of the ingots A-D, and the compositions of various conventional alloys are illustrated in Table 2. The aging practice for the −T7951 temper of the improved version of 7055 was a two-step practice consisting of a first step of 10 hours at 302° F. and a second step of 6 hours. The overaged tempers were obtained by increasing the first step from about 10 hours to about 19 to about 24 hours.

TABLE 2

| Alloy | wt. % Zn | wt. % Cu | wt. % Mg | wt. % Fe | wt. % Si | wt. % Zr |
|---|---|---|---|---|---|---|
| A | 7.7 | 1.81 | 1.62 | 0.024 | 0.014 | 0.11 |
| B | 764 | 2.15 | 1.65 | 0.028 | 0.021 | 0.10 |
| C | 8.05 | 2.08 | 1.78 | 0.044 | 0.026 | 0.12 |
| D | 7.83 | 2.17 | 1.84 | 0.036 | 0.020 | 0.11 |
| 7085 sample | 7.6 | 1.62 | 1.48 | 0.032 | 0.015 | 0.11 |
| 7085 AA range | 7.0-8.0 | 1.3-2.0 | 1.2-1.8 | 0.08 max | 0.06 max | 0.08-0.15 |
| 7055 Improved | 7.6-8.4 | 2.0-2.6 | 1.8-2.3 | 0.09 max | 0.06 max | 0.08-0.25 |
| 7055 AA Range | 7.6-8.4 | 2.0-2.6 | 1.8-2.3 | 0.15 max | 0.10 max | 0.08-0.25 |
| 7449 AA Range | 7.5-8.7 | 1.4-2.1 | 1.8-2.7 | 0.15 max | 0.12 max | (1) |

(1) 0.25 max Zr + Ti

The tensile and compressive strength, plane strain ($K_{Ic}$) and apparent plane stress ($K_{app}$) fracture toughness and exfoliation resistance of example alloys A thru D and the 7085 and improved 7055 controls were measured. Tensile testing was performed in accordance with testing standards ASTM E8 and ASTM B557 and compression testing in accordance with ASTM E9. Plane strain ($K_{Ic}$) fracture toughness testing was conducted in accordance with ASTM E399. The plane strain fracture toughness specimens were of full plate thickness and had a width W of 3 inches. Plane stress ($K_{app}$) fracture toughness testing was conducted in accordance with ASTM E561 and B646. Those skilled in the art will appreciate that the numerical value of $K_{app}$ typically increases as the test specimen width increases. $K_{app}$ is also influenced by specimen thickness, initial crack length and test coupon geometry. Thus, $K_{app}$ values can only be reliably compared from test specimens of equivalent geometry, width, thickness and initial crack length. Accordingly, testing on the example alloys and the 7085 and 7055 controls were all performed using center-cracked M(T) specimens having the same nominal dimensions, a width of 16 inches, a thickness of 0.25 inch and an initial fatigue pre-crack length (2ao) of 4 inches. The specimens were centered at mid-thickness (T/2) of the plate. Exfoliation testing using the EXCO method was also performed in accordance with ASTM G34. Test specimens were taken at mid-thickness (T/2) and one-tenth thickness (T/10).

The measured properties of example alloys A thru D and the nominal 7085 composition are given in Table 3. Alloy A exhibited an approximately 3 ksi increase in tensile yield and ultimate tensile strength over the nominal 7085 composition in Plate 1 size in both the L and LT direction, a strength increase of about 4%; while alloy B exhibited about a 5 ksi increase in tensile yield and ultimate tensile, an improvement of about 6%. Alloys C and D exhibited even higher strength. The increase in yield and ultimate tensile strength for both alloys was about 7 ksi, an improvement of about 8%. These are considered significant strength improvements by aircraft manufacturers. The improvement in strength was obtained while retaining excellent exfoliation resistance, all specimens of the example alloys achieving an EA rating.

TABLE 3

| Alloy/Panel | Dir | UTS (ksi) | TYS (ksi) | CYS (ksi) | KIc (ksi√in) | Kapp (ksi√in) | EXCO |
|---|---|---|---|---|---|---|---|
| 7085 Sample | L | 83.7 | 79.9 | 81.4 | 50.6 | 128.9 | EA (t/2) |
|  | LT | 83.7 | 79.6 | na | 41.1 | 102.6 | EA (t/10) |
| Example Alloy A Plate 1 | L | 86.7 | 83.2 | 84.3 | 50.9 | 127.5 | EA (t/2) |
|  | LT | 86.8 | 82.6 | na | 40.8 | 94.0 | EA (t/10) |
| Example Alloy A Plate 2 | L | 85.8 | 81.7 | 83.0 | 49.1 | 129.2 | EA (t/2) |
|  | LT | 85.7 | 81.5 | na | 39.6 | 91.9 | EA (t/10) |
| Example Alloy B Plate 1 | L | 89.3 | 85.7 | 86.7 | 43.8 | 113.2 | EA (t/2) |
|  | LT | 89.2 | 85.0 | na | 34.2 | 78.6 | EA (t/10) |
| Example Alloy B Plate 2 | L | 87.8 | 84.3 | 86.4 | 43.6 | 129.1 | EA (t/2) |
|  | LT | 88.5 | 84.1 | na | 34.5 | 86.0 | EA (t/10) |
| Example Alloy C | L | 90.2 | 87.2 | 86.5 | 36.0 | 115.6 | EA (t/2) |
|  | LT | 90.2 | 84.6 | na | 30.0 | 71.2 | EA (t/10) |
| Example Alloy D | L | 90.4 | 87.1 | 86.2 | 40.1 | 107.9 | EA (t/2) |
|  | LT | 90.6 | 86.5 | na | 31.5 | 68.8 | EA (t/10) |

Figure 3A:
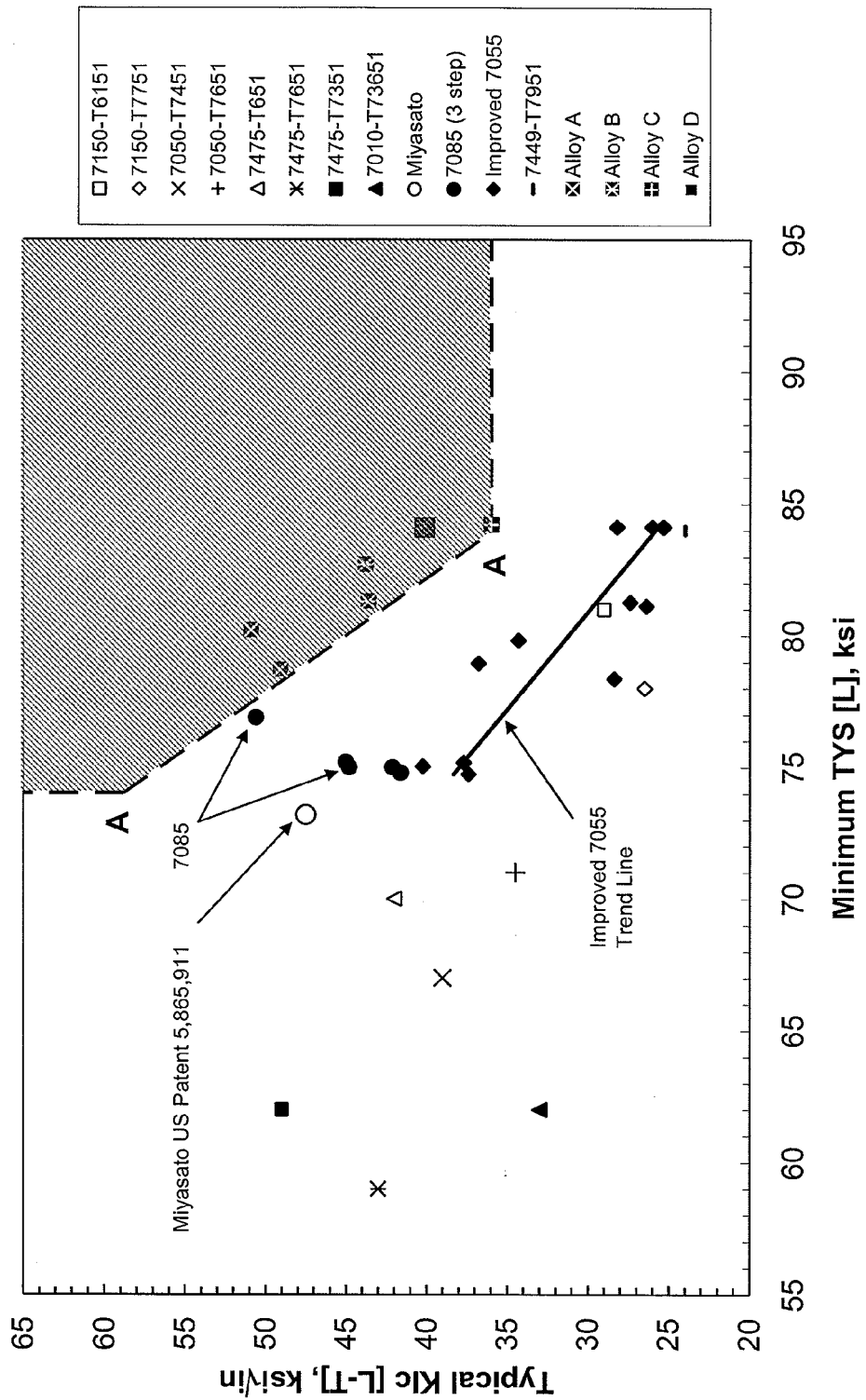
FIG. 3A is a graph illustrating typical L-T plane strain fracture toughness $K_{Ic}$ versus minimum longitudinal tensile yield strengths of (i) example alloys A-D in plate form and of a T79 temper, and (ii) several other conventional alloys in thin plate form.
Figure 3B:
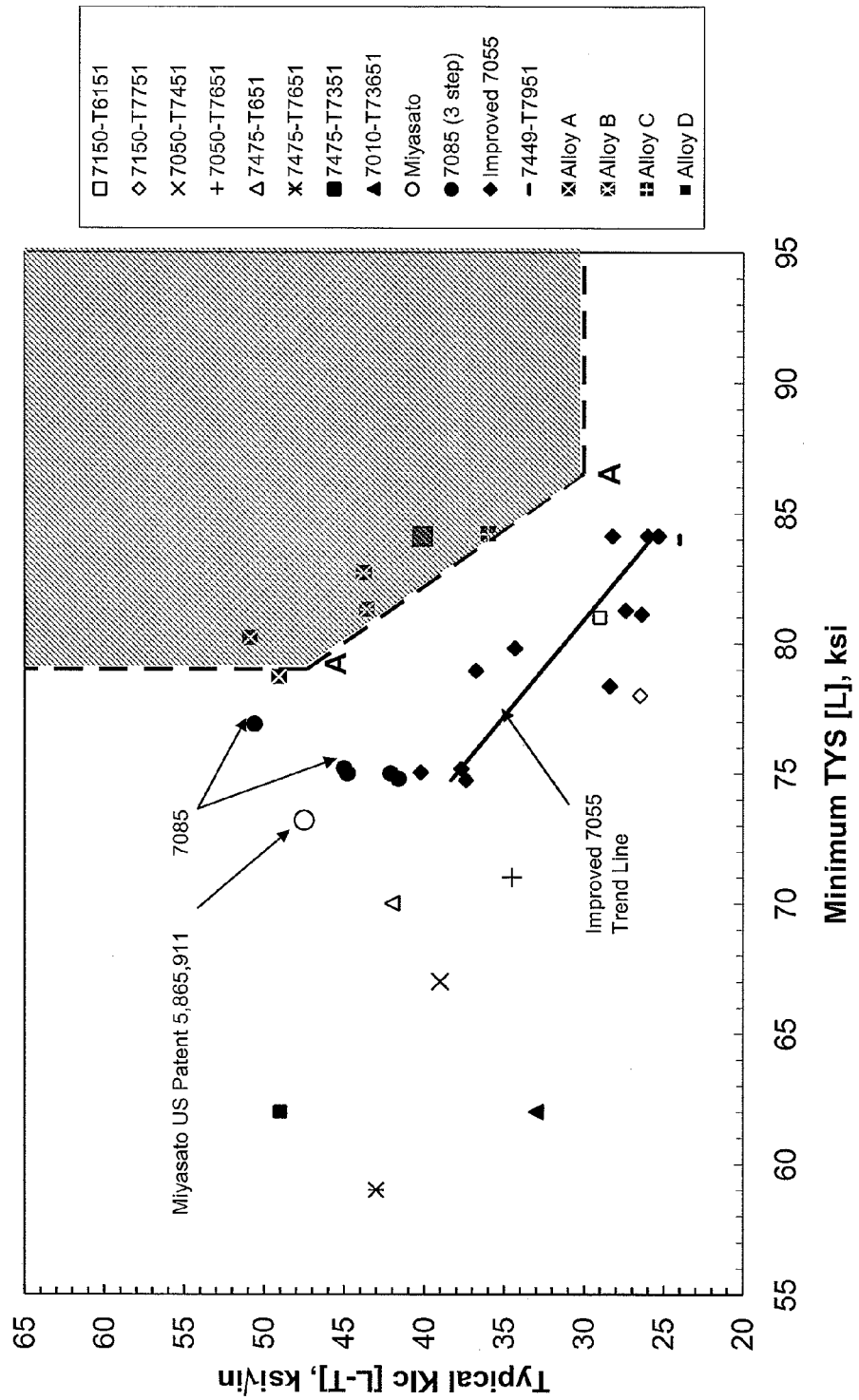
FIG. 3B is a graph illustrating typical L-T plane strain fracture toughness $K_{Ic}$ versus minimum longitudinal tensile yield strengths of (i) example alloys A-D in plate form and of a T79 temper, and (ii) several other conventional alloys in plate form.
Figure 4:
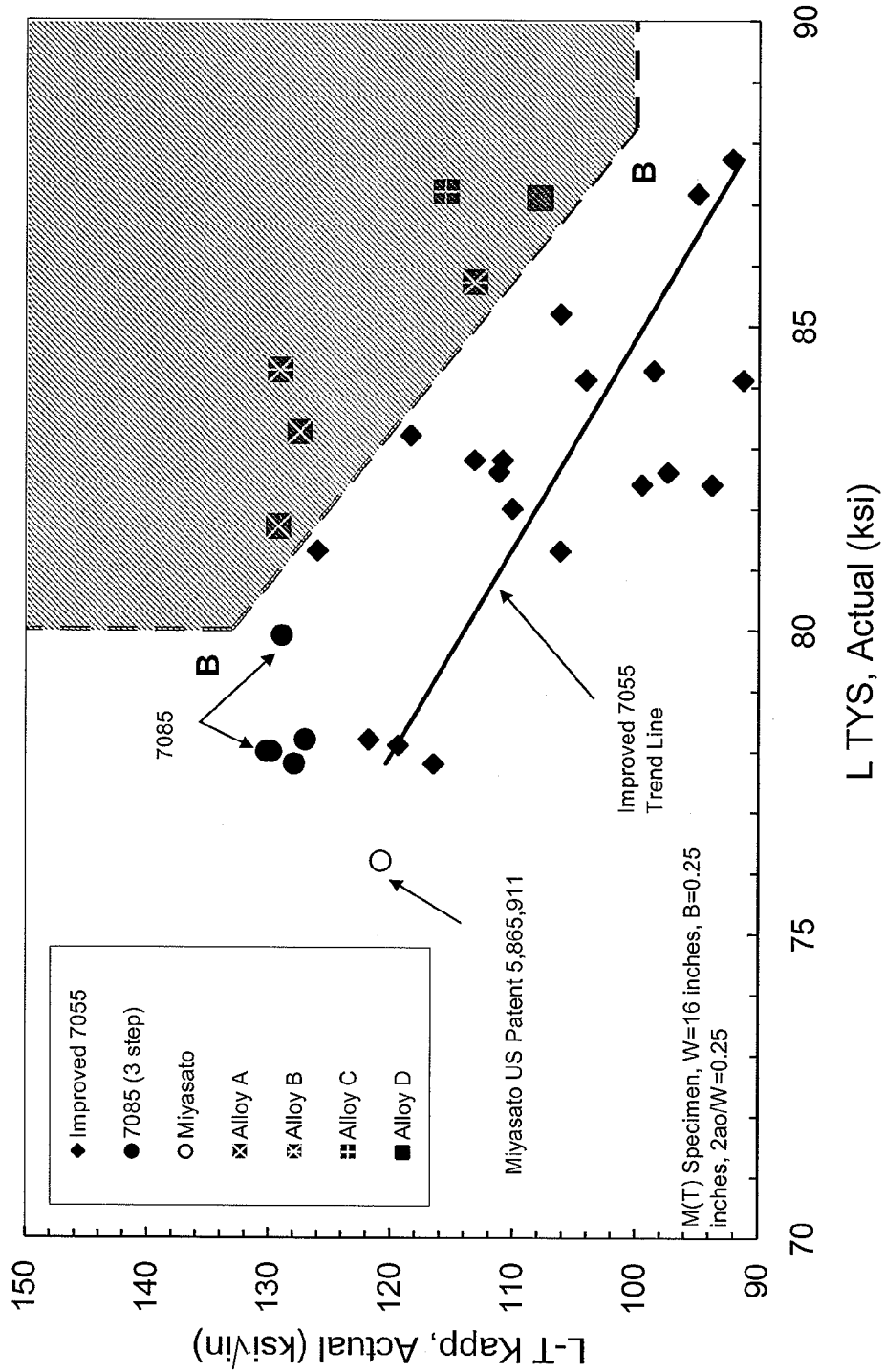
FIG. 4 is a graph illustrating typical L-T plane stress fracture toughness $K_{app}$ versus actual or measured tensile yield strengths of (i) example alloys A-D in plate form and of a T79 temper and (ii) several other conventional alloys in plate form.

The combinations of strength and toughness of example alloys A thru D are shown in FIGS. 3A, 3B and 4 where they are compared to prior art alloys. FIGS. 3A and 3B compare plane-strain fracture toughness $K_{Ic}$ in the L-T orientation, which corresponds to the principal direction of loading in the upper wing, as a function of the minimum tensile yield strength in the L (rolling) direction of example alloys A thru D, the 7085 sample control lots (Table 3), another four lots of 7085 thin plate given a lower strength aging practice more suitable for lower wings (Table 1), and values from the improved version of 7055 in the T7951 temper and with overaged tempering treatments. In addition, typical fracture $K_{Ic}$ fracture toughness of other prior art alloys in thin plate form are shown. For the example alloys and the overaged tempers of 7055, for which no material specifications currently exist, the minimum tensile yield strength was estimated by subtracting 3 ksi from the measured value. One minimum performance line for the instantly disclosed alloys is designated by the line A-A, which has an equation of FT=−2.3* (TYS)+229, wherein TYS is the L tensile yield strength of the plate in ksi as measured in accordance with ASTM Standard E8 and ASTM B557, and wherein FT is the L-T plane strain fracture toughness of the plate in ksi√inch as measured in accordance with ASTM E399.

FIG. 3A also includes a shaded region highlighting potential properties of thin plate alloy products of the instant disclosure. The shaded region is bound by a minimum L-T toughness of 36 ksi√inch, a minimum strength of 74 ksi, and line A-A, which has an equation of FT=−2.3*(TYS)+229, as provided above. The shaded region of FIG. 3A is particularly suited for thin plate alloy products of a T74 temper, although alloys having other tempers (e.g., T6, T73, T76, T79) may be produced that may have properties that lie within the shaded region.

FIG. 3B also includes a shaded region highlighting potential properties of thin plate alloy products of the instant disclosure. The shaded region is bound by a minimum toughness of 30 ksi√inch, a minimum strength of 79 ksi, and line A-A, which has an equation of FT=−2.3*(TYS)+229, as provided above. The shaded region of FIG. 3B is particularly suited for thin plate alloy products of a T76 temper, although alloys having other tempers (e.g., T6, T73, T74, T79) may be produced that may have properties that lie within the shaded region.

FIG. 4 compares the L tensile yield strength and the apparent plane stress fracture toughness ($K_{app}$) of embodiments of the instantly disclosed alloys in the L-T orientation again with the five lots of 7085 and values from improved 7055. The improved combination of strength and toughness of 7085 with respect to the improved version of 7055 is obvious. One minimum performance line for the instantly disclosed alloys is designated by the line B-B, which has an equation of FT=−4.0*(TYS)+453, where TYS is the L tensile yield strength of the plate in ksi as measured in accordance with ASTM Standard E8 and ASTM B557, where FT is the L-T plane stress fracture toughness ($K_{app}$) of the plate in ksi√inch, where FT is measured in accordance with ASTM Standard E561 and B646 on a center-cracked aluminum alloy specimen taken from the T/2 location of an aluminum alloy plate, and where the specimen has a width of 16 inches, a thickness of 0.25 inch and a initial fatigue pre-crack length of 4 inches Even with significant overaging to achieve the same or similar strength level as in the instantly disclosed alloy, the fracture toughness of 7055 is significantly lower. Since the Cu and Mg levels in the instantly disclosed alloys lies between that of 7085 and the improved version of 7055, while Fe and Si levels are similarly low, the expectation was that the combination of strength and toughness achievable in the instantly disclosed alloys would fall between that of 7085 and improved 7055. Surprisingly, the instantly disclosed alloys exhibited an improved combination of strength and toughness, not only over improved 7055 but also over 7085. Thus embodiments of the instantly disclosed alloys identify a "sweet" composition region which offers higher combinations of strength and fracture toughness than exhibited by prior art alloys. While the $K_{app}$ values and relative improvements correspond to a test coupon of the type and dimensions noted, it is expected that similar relative improvements will be observed in other types and sizes of test coupons. However, those skilled in the art will also appreciate that the actual $K_{app}$ values may vary significantly in other specimen types and sizes as previously described and the magnitude of the difference may also vary.

FIG. 4 also includes a shaded region highlighting potential properties of thin plate alloy products of the instant disclosure. The shaded region is bound by a minimum toughness ($K_{app}$) of 100 ksi√inch, a minimum tensile yield strength of 80 ksi, and line B-B, which has an equation of FT=−4.0*(TYS)+453, as provided above. The shaded region of FIG. 4 is particularly suited for thin plate alloy products of a T79 temper, although alloys having other tempers (e.g., T6, T73, T74, T76) may be produced that may have properties that lies within the shaded region. Furthermore, some thin plate products of the instant disclosure may be able to realize both the plane stress fracture toughness and tensile yield strength values defined by the shaded region of FIG. 4 as well as the plane strain fracture toughness and tensile yield strength values defined by the shaded region of FIGS. 3A and/or 3B.

Example 2

Four sets of samples in the solution heat treated, quenched and stretched condition (W51 temper) from example alloys A and B plate fabricated in Example 1 were given the first two aging steps of the three-step practice used in Example 1. Subsequently, the first set of samples were given a third step with an aging time of 24 hours, the same as that employed in Example 1, while the second and third set were given shorter aging times, of 6 and 12 hours. In the fourth set of samples, the third step was not applied (0 hours). Tensile specimens with a diameter of 0.125 inch were machined in the long transverse (LT) direction and short transverse (ST) direction for both an alternate immersion (AI) stress corrosion cracking resistance test and seacoast (SC) exposure test (also sometimes referred to herein as the seacoast environment stress corrosion cracking resistance test). Alternate immersion testing was conducted in accordance with ASTM G44, G47 and/or G49. More specifically, the specimens were exposed to cycles of immersing in a 3.5% NaCl aqueous solution for 10 minutes, followed by 50 minutes of air drying while being stressed under a constant strain necessary to achieve the desired stress level. The seacoast exposure testing was conducted at Alcoa's Pt. Judith, R.I. seacoast exposure site, as described below.

Three 3rd step aging times, 0, 12 and 24 hours, and two stress levels, 16 and 20 ksi were selected for the ST direction. The first stress level represents the minimum requirement for current upper wing alloys, 7055 and 7449 in the ST direction. The second stress level corresponds to a 25% higher stress level. The exposure period for AI testing for 7XXX alloys for the ST direction is typically 20 or 30 days or until failure occurs. In these tests, the maximum exposure period for AI was extended to 150 days to better assess the performance of the different aging practices. For seacoast exposures, the maximum exposure period was 466 days. The results of the stress corrosion cracking (SCC) tests are given in Table 4.

TABLE 4

| Alloy | Panel | 3rd Step Time (h) | LT Tensile (ksi) YS | UTS | SCC Testing Location | Stress (ksi) | # of tests | Failure (days) |
|---|---|---|---|---|---|---|---|---|
| A | 2 | 0 | 82.5 | 86.2 | AI | 16 | 5 | 48, 101, 101, 101, 115 |
|   |   |   |   |   | AI | 20 | 5 | 32, 59, 70, 101, 115 |
|   |   |   |   |   | SC | 16 | 5 | 297, 311 |
|   |   |   |   |   | SC | 20 | 5 | 290, 290, 339, 349 |
| A | 2 | 12 | 83.8 | 87.4 | AI | 16 | 5 | 78, 97, 101 |
|   |   |   |   |   | AI | 20 | 5 | 53, 98, 101, 101, 101 |
|   |   |   |   |   | SC | 16 | 5 | 325, 339 |
|   |   |   |   |   | SC | 20 | 5 | 66, 325, 339, 367 |
| A | 2 | 24 | 83.7 | 87.3 | AI | 16 | 5 | 101, 101, 101, |

TABLE 4-continued

| Alloy | Panel | 3rd Step Time (h) | LT Tensile (ksi) YS | UTS | SCC Testing Location | Stress (ksi) | # of tests | Failure (days) |
|---|---|---|---|---|---|---|---|---|
| | | | | | AI | 20 | 5 | 115, 129 44, 73, 98, 101, 143 |
| | | | | | SC | 16 | 5 | 332 |
| | | | | | SC | 20 | 5 | 332, 346, 346, 402 |
| A | 1 | 12 | 84.1 | 87.6 | AI | 16 | 5 | 87, 129, 143, 143 |
| | | | | | AI | 20 | 5 | 59, 98, 101, 101, 101 |
| | | | | | SC | 16 | 5 | 325, 332, 332, 339 |
| | | | | | SC | 20 | 5 | 325, 332, 339 |
| B | 2 | 12 | 85.5 | 89.2 | AI | 16 | 5 | 115, 135, 135 |
| | | | | | AI | 20 | 5 | 29, 54, 101, 101, 115 |
| | | | | | SC | 16 | 5 | 234, 332 |
| | | | | | SC | 20 | 5 | 122, 311, 325 |

The results from example alloy A, Panel 2 with 3rd step aging times of 0 (i.e., no third step) 12 and 24 hours indicate there is no significant difference in the SCC resistance of the instantly disclosed alloys with or without a 3rd aging step or for a shorter or longer 3rd step aging time. In all cases, the number of days to failure exceeded the standard exposure times of 20 or 30 days for 7XXX alloys for AI SCC at both the 16 ksi stress level, the minimum requirement for current upper wing alloys, and at the 25% higher stress level of 20 ksi. The number of days to failure was also similar for the 3 different aging times. The SCC resistance of the three 3rd step aging times was also similar for the seacoast exposures. Alloy A, Panel 1 and example alloy B, Panel 2 were evaluated only for the 12-hour 3rd step aging time. Panel 1 is thinner and wider than Panel 2 and therefore is expected to have a different grain aspect ratio and possibly different SCC resistance. The results for alloy A, Panel 1, appeared to be slightly better than those for Panel 2. The results for alloy B, Panel 2 were similar and possibly better than for alloy A, Panel 2.

SCC tests in the LT direction were also conducted. For the LT direction, the exposures were interrupted after 30, 47 and 90 days and the exposed specimens subjected to breaking load testing in accordance with ASTM G 139. The percentage retained or residual strength of the exposed specimen compared to the unexposed tensile strength was determined. The stress levels for the LT direction were 42 and 63 ksi, corresponding to approximately 50% and 75% of the LT yield strength of the instantly disclosed alloys. This test is a means to obtain more quantitative information in a shorter time, and thus is useful for the more SCC resistant LT direction where specimen failures are expected to occur at longer times, and possibly with greater scatter, than the less SCC resistant ST direction. In one experiment, breaking load tests were conducted on example alloys A and B given a 3rd step aging practice of 0, 6 and 12 hours after an exposure period of 47 days. In a second experiment, breaking load tests were conducted on example alloy A and a 7055-T7951 control after exposure periods of 30 and 47 days in AI and 90 days seacoast exposure at a stress levels corresponding to 50 and 75% of the LT yield strength for each alloy. In both experiments, unstressed samples were also included. The inclusion of unstressed and stressed samples allows the strength loss resulting from general corrosion and pitting and the loss from SCC to be separated.

Figure 5:
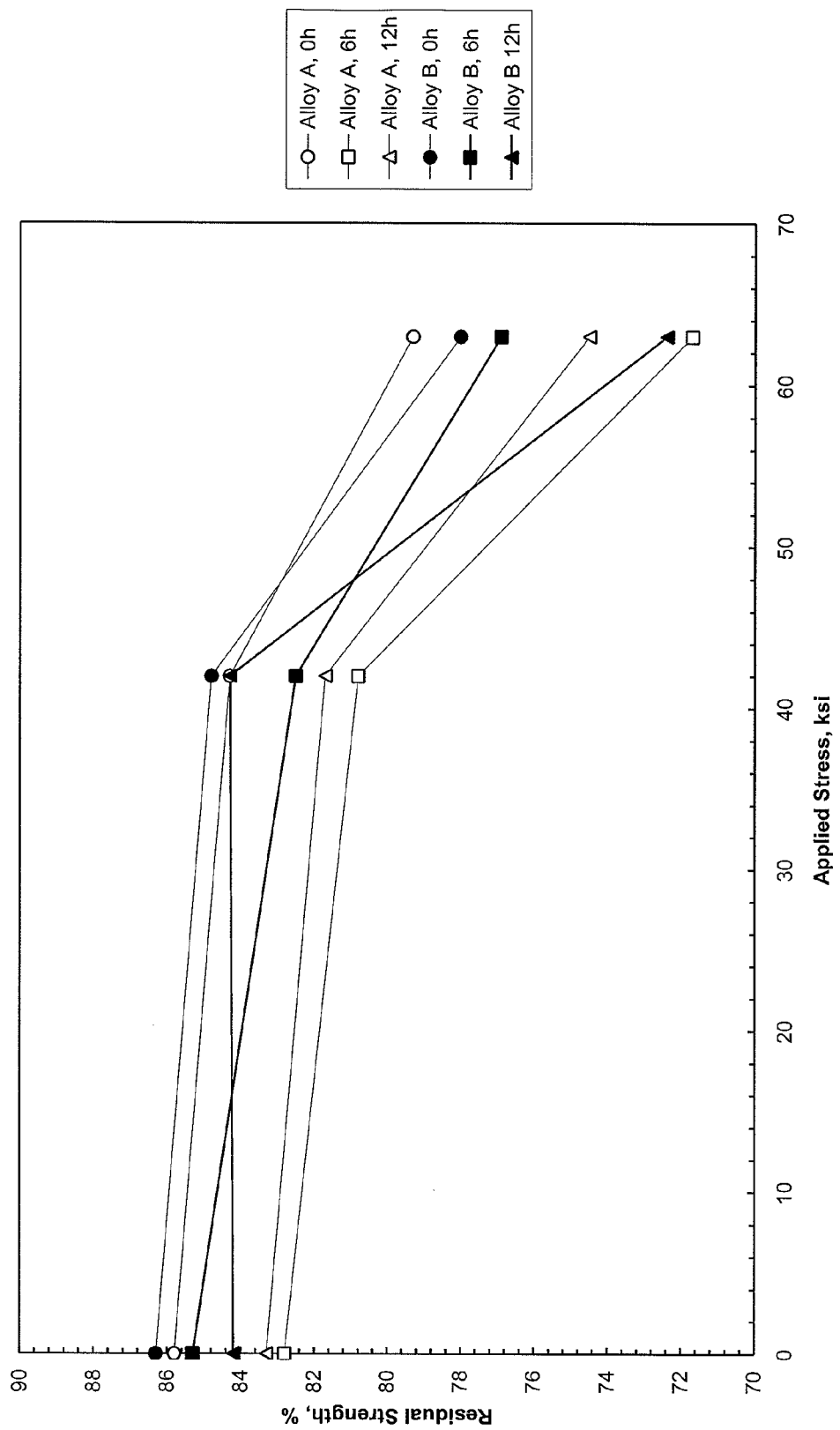
FIG. 5 is a graph comparing the percentage retained strength after corrosion exposure in the LT direction of two of the example alloy compositions for three 3rd step aging times of 0, 6 and 12 hours.
Figure 6:
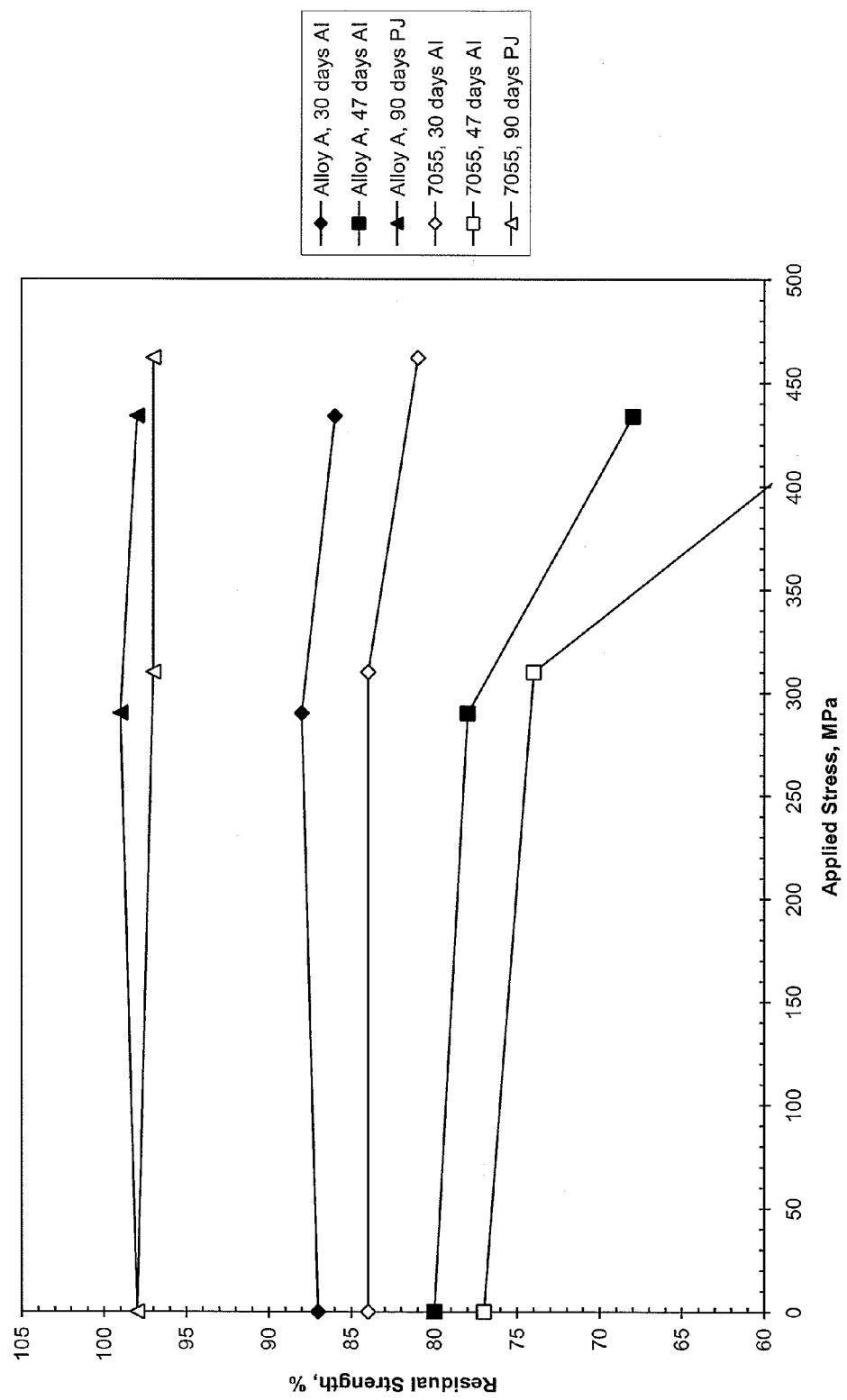
FIG. 6 is a graph comparing the percentage retained strength after corrosion exposure in the LT direction of an example alloy and a prior art 7055 alloy for a 12-hour 2nd step aging time.

The results of the first experiment are shown in FIG. 5, each point representing an average of 5 specimens. Here, the percentage retained strength is the ratio of the strength of an exposed specimen to that of an unexposed specimen (i.e., uncorroded) expressed on a percentage basis. The results indicate there was no loss in general corrosion resistance (unstressed) or SCC resistance (stressed) with the elimination of the 3rd aging step. In fact, the specimens without the 3rd step had a greater retained or residual strength than those with a 6 or 12-hour 3rd step. For a given aging time, alloy B outperformed alloy A. The results of the second experiment are given in FIG. 6, each point representing an average of 5 specimens. FIG. 6 is a graph comparing the percentage retained strength in the LT direction of the instantly disclosed alloys and prior art alloy 7055 for a 12-hour 2nd step aging time following exposures of 30 and 47 days in 3.5% NaCl solution and 90 days seacoast exposure at stress levels of 50 and 75% of the yield strength of each alloy. Example alloy A had greater percentage retained strength than the 7055 alloy for all three exposures in both the unstressed and stressed condition and at the two stress levels.

Overall, the corrosion results indicate that both the 2- and 3-step aging practice provide acceptable corrosion performance of the instantly disclosed alloys for upper wing applications. One disadvantage of the 2-step practice is that the strength is slightly lower as illustrated in Table 4 for example alloy A. Compared to a 3rd step age time of 24 hours, the yield strength without the 3rd step was about 1 ksi higher. As previously described, the flexibility in aging practice of the instantly disclosed alloys is a beneficial characteristic. A 2-step practice is typical for applications such as upper wing skin and stringer, where the aging is partly or fully applied during an age forming process by the aircraft manufacturer or subcontractor and it is desirable that the age forming cycle be as short as practicable to maximize production throughput. In this regard, the instantly disclosed alloys with the 2-step practice utilized herein, which had a total soak time of 13 hours, offers an improvement over the current upper wing alloys. Depending on the age forming requirements, this could possibly be shortened further to about 7 hours if the first step is applied by the material producer and only the second step is carried out in the age forming process.

A 3-step practice may be used when the material is supplied by the producer in the fully aged condition for applications such as an upper wing spar or spar web in a built-up design. A lower strength temper, such as a T76 or T74 temper, using either a 2- or 3-step practice, may also be used for these applications depending on the requirements and the direction of the design stresses relative to the alloy products grain orientation. When the instantly disclosed alloys are to be welded to another alloy product and post weld aged as part of a multi-alloy component, a 2- or 3-step practice could be used depending on the aging practice of the alloy or alloys to which the instantly disclosed alloys are to be joined. The flexibility afforded by the instantly disclosed alloys may also be useful for combining the curing cycles of adhesives used to attach reinforcing materials with the aging of the instantly disclosed alloys.

Example 3

Samples of example alloy A plate in the solution heat treated, quenched and stretched condition (W51 temper) fabricated in Example 1 were machined into panels 0.5 inch thick by 6 inches wide by 35 inches long. Samples from 2099 extrusion were acquired in the T3511 temper and machined to the same dimensions. In both cases the length dimension was in the rolling direction 2099 is a commercially available aluminum-lithium alloy registered with the Aluminum Association having the composition 2.4-3.0 wt. % Cu, 0.1-0.5 wt. % Mg, 0.4-1.0 Zn, 0.1-0.5 Mn, 0.05-0.12 Zr and 1.6-2.0 Li, the remainder Al and incidental impurities. Panels of the example alloy A and 2099 were joined by friction stir welding with the weld line along the length of the panels. This combination of the instantly disclosed alloys and 2099, which have very dissimilar compositions could be used, for example, for a multi-alloy spar or rib. In a spar, the instantly disclosed alloys could be used in the upper cap and web where high compressive strength is needed and 2099 in the lower spar cap where high resistance to fatigue crack growth is beneficial. Similarly, in the rib, the instantly disclosed alloys could be used in the feet where high strength is important and 2099 in the spar web where high stiffness and low density are beneficial.

Prior to the friction stir welding operation, the alloy A and 2099 panels were aged separately. The pre-weld aging for alloy A consisted of a first step of 6 hours at 250° F. while the pre-weld aging practice of 2099 consisted of a first and second step of different times and/or temperatures than that used for the instantly disclosed alloys. The post-weld aging practice of the joined panels was necessarily the same and consisted of a first step of 6 hours at 250° F. and a second step of 18 hours at 305° F. Post-weld aging is desirable for improving the strength and corrosion properties of the weld area. In order to increase the weld properties, in particular the strength and corrosion resistance, as much of the aging as possible should be conducted after welding. However, for dissimilar alloys the ability to do so may be limited by the individual aging requirements for each alloy and the final desired temper for each. The pre-weld aging practices for each alloy and the post-weld aging practice for the multi-alloy panel were carefully selected to target a −T76 type temper in the instantly disclosed alloys and a −T83 type temper in the 2099. Even so, some compromise in the aging practices of both alloys was necessary and the flexibility of the instantly disclosed alloys with respect to the number of aging steps and times that can be successfully utilized while obtaining good properties was beneficial in that regard.

Mechanical properties including tensile strength, compressive strength, tensile and compressive elastic modulus, and fracture toughness were measured in the base metals (i.e., outside the weld and heat affected zone), the heat affected zone (HAZ) and the weld following the post-weld age. The extent of the each region and the position of the specimens therein were determined using Vicker's micro-hardness (VHN) measurements across the weld and optical micrographs. The testing was performed in accordance with the applicable ASTM test methods: ASTM E8 and B557 for tensile testing, E9 for compression testing, E111 for tensile and compressive modulus testing, and ASTM E399 for plane strain fracture toughness. Tensile properties were measured in the L and LT directions. Compressive strength and elastic modulus were measured in the L direction only. The plane strain fracture toughness specimens were in the T-L orientation, had a width W of 2 inches and were of full panel thickness. The fracture specimens were excised from the panel so that their machined slot (representing the expected plane of crack extension) was aligned with the region of interest. Two specimens were taken in the weld and HAZ, one specimen with the machined notch pointed in the same direction as the friction stir welding tool had traveled during the welding operation and one with the machined notch pointed in the opposite direction. The results from these tests are given in Table 5.

TABLE 5

| Property | Dir | Alloy A Base Metal | Alloy A HAZ | Weld | 2099 HAZ | 2099 Base Metal |
|---|---|---|---|---|---|---|
| UTS (ksi) | L | 84.5 | 56.8 | 61.2 | 77.6 | 83.1 |
|  | LT | 84.3 |  | 62.4* |  | 77.2 |
| TYS (ksi) | L | 79.8 | 43.9 | 59.0 | 69.9 | 76.0 |
|  | LT | 79.1 |  | 50.3* |  | 70.6 |
| CYS (ksi) | L | 82.3 | 69.5 | 60.9 | 76.2 |  |
| Et (Mpsi) | L | 10.3 | 10.4 |  | 11.5 | 11.5 |
| Ec (Mpsi) | L | 10.7 | 10.7 | 11.3 | 11.8 | 11.9 |
| KIc, Kq (ksi√in) | T-L | 41.5 | $34.2^1$, $36.2^2$ | $40.5^1$, $38.2^2$ | $26.4^1$, $27.1^2$ | 32.1 |

Notes:
*LT tensile specimens traversed both the weld and HAZ failing in the weakest location.
[1] Crack extension in the same direction as that traveled by the welding tool during the welding operation.
[2] Crack extension in the opposite direction to that traveled by the welding tool during the welding operation.

Even with the compromise in aging practices made for each alloy, the base metal of each which received the pre-weld aging practice (different for each alloy) and post-weld aging practice (the same for each alloy) achieved the desired strength and toughness level for the targeted tempers. The properties in the HAZ and weld were lower as is typically observed for welds. The weld region is essentially solution heat treated during the friction stir welding process so the artificial aging of this region occurs only during the post-weld age. Likewise, the HAZ is also heated during the welding process but at a temperature which is below that used for solution heat treating and thus inadequate to fully solutionize the alloying elements. This can limit its aging response in the HAZ during the post-weld age and degrade its strength and fracture toughness. Despite these factors, the weld efficiency (i.e, the ratio of the weld strength to the base metal strength) achieved was quite good. Measured perpendicular to the weld line where the tensile specimen included both the weld and HAZ, the weld efficiency was 71% for tensile yield strength (TYS) and 81% for ultimate tensile strength compared to the base metal strength for 2099 in the LT direction.

The fracture toughness achieved in the weld and HAZ were also satisfactory. In the weld zone the fracture toughness was equivalent to that in the alloy A base metal, while the fracture toughness in the HAZ on both the alloy A and 2099 side of the weld were lower than in their respective base metal but still sufficient to meet the requirements of most aircraft structure.

Stress corrosion cracking (SCC) and exfoliation testing were also performed on the joined panels following the post-weld age. For SCC testing, flat tensile-type specimens with a thickness of 0.235 inch were machined at mid-thickness perpendicular to and across the weld and HAZ. Three specimens each were tested at two stress levels, 26 and 35 ksi by alternate immersion in accordance with ASTM G44, G47 and/or G49. No failures were observed after an exposure period of 250 days. For exfoliation testing, two rectangular specimens of full panel thickness containing the weld, HAZ and base metals were tested using the EXCO test method in accordance with ASTM G34. This test method is an appropriate accelerated test method for 7XXX alloys such as the instantly disclosed alloys. A second set of specimens of full panel thickness were tested using Dry Bottom MASTMAASIS in accordance with ASTM G85. This test method is an appropriate accelerated test method for 2099. Both the base metal of alloy A and 2099 had an exfoliation rating of EA. This rating is indicative of good corrosion performance and consistent with the typical performance of the targeted tempers for each alloy. The weld region which contained a mixture of both alloys had a rating of EB by the EXCO test method, again indicating reasonably good exfoliation corrosion resistance. Some degradation in corrosion performance of the weld is expected since this region receives only the post-weld age. The HAZ in 2099 had a MASTMAASIS rating of P, however the HAZ in alloy A exhibited localized attack and had an EXCO rating of ED. This corrosion performance may be unacceptable for internal aircraft structure such as spars and ribs but could likely be improved by optimizing the friction stir welding parameters or using cooling methods during welding in order to reduce heat input into the HAZ. This region could also be protected in service by the use of corrosion protection methods. For example, prior to the application of anodize and an anti-corrosive primer, which are already commonly used for corrosion protection in internal structure, an aluminum alloy more anodic than the instantly disclosed alloys could be applied along the weld line by thermal spray or other methods. Galvanic corrosion resulting from differences in corrosion potential in alloy A and 2099 may have contributed to the localized attack in the HAZ of alloy. In this case, the use of leaner and richer alloys of similar composition to the instantly disclosed alloys, which should have less difference in corrosion potential than two very dissimilar alloys, or the use of the instantly disclosed alloys alone in different tempers may be beneficial for improving corrosion resistance in the HAZ.

Example 4

Two ingots are cast as large commercial scale ingots. The ingots have a composition consistent with the teachings of the instant disclosure. The first ingot is designated alloy E and the second ingot is designated alloy F. In addition, four ingots of Aluminum Association alloy 7085 and six ingots of Aluminum Association alloy 7050 are cast as control. The composition of the alloys E and F, the 7050 and 7085 control ingots, and the composition ranges for 7085 and 7050 registered with the Aluminum Association are provided in Table 6.

TABLE 6

| Alloy | wt. % Zn | wt. % Cu | wt. % Mg | wt. % Fe | wt. % Si | wt. % Zr |
|---|---|---|---|---|---|---|
| E | 7.57 | 2.11 | 1.63 | 0.04 | 0.01 | 0.11 |
| F | 7.64 | 2.15 | 1.65 | 0.03 | 0.02 | 0.1 |
| 7050-lot 1 | 6.07 | 2.21 | 2.18 | 0.08 | 0.05 | 0.11 |
| 7050-lot 2 | 6.07 | 2.21 | 2.18 | 0.08 | 0.05 | 0.11 |
| 7050-lot 3 | 6.00 | 2.22 | 2.15 | 0.08 | 0.05 | 0.11 |
| 7050-lot 4 | 6.04 | 2.29 | 2.17 | 0.07 | 0.04 | 0.11 |
| 7050-lot 5 | 6.04 | 2.29 | 2.17 | 0.07 | 0.04 | 0.11 |
| 7050-lot 6 | 6.09 | 2.26 | 2.20 | 0.08 | 0.04 | 0.11 |
| 7085-lot 1 | 7.47 | 1.64 | 1.50 | 0.05 | 0.02 | 0.11 |
| 7085-lot 2 | 7.48 | 1.68 | 1.50 | 0.05 | 0.01 | 0.11 |
| 7085-lot 3 | 7.35 | 1.65 | 1.50 | 0.04 | 0.02 | 0.12 |
| 7085-lot 4 | 7.31 | 1.65 | 1.44 | 0.03 | 0.02 | 0.12 |
| AA7085 range | 7.0-8.0 | 1.3-2.0 | 1.2-1.8 | 0.08 max | 0.06 max | 0.08-0.15 |
| AA7050 range | 5.7-6.7 | 2.0-2.6 | 1.9-2.6 | 0.15 max | 0.12 max | 0.08-0.15 |

The ingots are scalped and homogenized with a final soak temperature of about 870° to 910° F. The ingot with composition E is hot rolled to plate having a thickness of 3.125 inches while ingot with composition F is hot rolled to plate having a thickness of 4.0 inches. Such dimensions are representative of standard aerospace plate used for integrally machined parts. Lots 1-3 of the 7085 control ingots are hot rolled to plate having a thickness of about 4 inches. Lot 4 of the 7085 control ingot is hot rolled to plate having a thickness of about 3 inches. Three 7050 control ingots are hot rolled to plate having a thickness of about 4 inches. Another three 7050 control ingots are hot rolled to plate having a thickness of about 3 inches. All ingots were cross-rolled in the long transverse direction by less than 15%. All plates were solution heat treated between about 880° and 900° F. for about 2 to 4 h, water spray quenched to ambient temperature, and cold stretched about 1.5 to 3%.

Samples from the alloy E and F plates were obtained. These samples were aged to a T74-type temper (suitable for integrally machined components) using a conventional three-step practice. The three-step practice consisted of a first step of about 6 hours at 250° F., a second step between 15 and 20 h at a temperature of 310° F. and a third step of about 24 hours at 250° F. Some of the alloy E and F samples were aged for 15 hours during the second step (samples 1). Others of the alloy F samples were aged for 18 hours during the second step (sample 2). Others of the alloy E samples were aged for 20 hours during the second step (sample 2). The 7085 4-inch control lots were also aged to a T74 temper using this conventional 3-step aging process. Sample 1 of lot 4 (3-inch plate) of the 7085 control lots was aged to a T76 temper using a conventional 3-step aging process, and sample 2 of lot 4 (3-inch plate) of the 7085 control lots was aged to a T74 temper using a conventional 3-step aging process. The 7050 control lots were aged to a T74 temper using a conventional 2-step aging process.

The tensile properties and plane strain ($K_{Ic}$) fracture toughness of the samples of alloys E and F and the 7085 and 7050 control lots were measured. Tensile testing was performed in accordance with ASTM E8 and ASTM B557. Plane strain ($K_{Ic}$) fracture toughness testing was performed in accordance with ASTM E399. The plane strain fracture toughness specimens for alloy E were 2 inches thick and had a width W of 4 inches in the T-L orientation, and were 1 inch thick and had a width W of 2 inches in the S-L orientation. The plane strain fracture toughness specimens for alloy F were 1 inch thick and had a width W of 2 inches in both the T-L and S-L orientations. The fracture toughness specimens for alloys E and F were centered at mid-thickness (T/2) of the plate. The plane strain fracture toughness specimens for the 4-inch control 7085 plates were 2 inches thick and had a width W of 4 inches in the T-L orientation, and were 1.5 inches thick and had a width W of 3 inches in the S-L orientation. The plane strain fracture toughness specimens for the 3-inch control 7085 plates were 1.75 inch thick and had a width W of 5 inches in the T-L orientation, and were 1.25 inches thick and had a width W of 2.5 inches in the S-L orientation. The fracture toughness specimens for the 4-inch control 7085 plates were centered at quarter-thickness (T/4) of the plate in the T-L orientation and at mid-thickness (T/2) of the plate in the S-L orientation. The fracture toughness specimens for the 3-inch control 7085 plates were centered at mid-thickness (T/2) of the plate in both the T-L and S-L orientations. The plane strain fracture toughness specimens in the T-L orientation for the control 7050 plates were 2 inches thick and had a width W of 4 inches. The plane strain fracture toughness specimens in the S-L orientation for the 3-inch thick control 7050 plates were 1 inch thick and had a width W of 2 inches. The plane strain fracture toughness specimens in the S-L orientation for the 4-inch thick control 7050 plates were 1.5 inches thick and had a width W of 3 inches. The fracture toughness specimens for the control 7050 plates were centered at mid-thickness (T/2) of the plate in both the T-L and S-L orientations. Exfoliation testing using the EXCO method was performed for alloy F in accordance with the ASTM G34 standard, where test specimens were taken at mid-thickness (T/2), quarter-thickness (T/4) and one-tenth thickness (T/10).

The measured properties of alloys E and F and the 7085 and 7050 control lots are provided in Table 7. At a plate thickness of about 3 inches, alloy E exhibited an approximately 9 to 12 ksi increase in tensile yield strength and about a 6 to 8 ksi increase in ultimate tensile strength over the 7050 control lots in the LT direction. Similarly, alloy E exhibited an approximately 8 to 10 ksi increase in tensile yield strength and about a 6 to 8 ksi increase in ultimate tensile strength over the 7050 control lots in the ST direction. At a plate thickness of 4 inches, alloy F exhibited an approximately 7 to 9 ksi increase in tensile yield strength and about a 3 to 4 ksi increase in ultimate tensile strength over the 7050 control lots in the LT direction. Similarly, alloy F exhibited an approximately 5 to 7 ksi increase in tensile yield strength and about a 4 to 5 ksi increase in ultimate tensile strength over the 7050 control lots in the ST direction. Alloy F exhibits strength improvements of about 2 to 5 ksi for tensile yield and ultimate strength in both the LT and ST directions compared to the 7085 control lots of a T74 temper. These strength improvements are considered significant strength improvements by aircraft manufacturers.

better stress corrosion resistance than a similarly produced and sized 7085 alloy, but at a higher LT strength. Thus, alloy E realizes a heretofore unrealized combination of LT strength, T-L toughness, and corrosion resistance at the stated thickness range.

Figure 7:
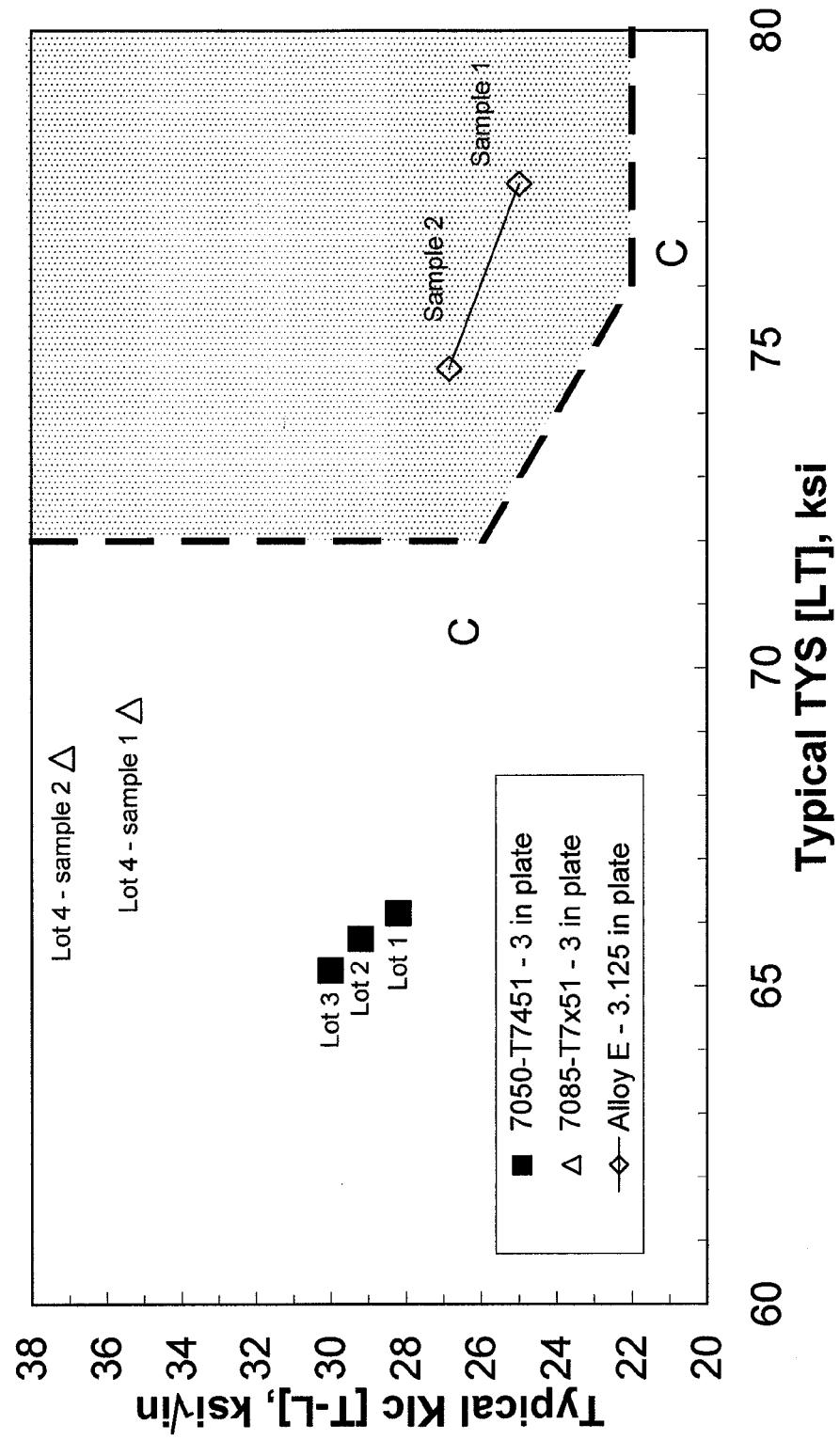
FIG. 7 is a graph illustrating typical T-L plane strain fracture toughness $K_{Ic}$ versus typical LT tensile yield strengths of plates of (i) example alloy E (having a thickness of 3.125 inches) and of a T74 temper, and (ii) several other conventional alloys (having a thickness of about 3 inches)

FIG. 7 also includes a shaded region highlighting potential properties of alloy plate products of the instant disclosure. The shaded region is bound by a minimum toughness of 22 ksi√inch, a minimum strength of 72 ksi, and line C-C, which has an equation of $FT\_TL = -1.0*(TYS\_LT) + 98$, where $TYS\_LT$ is the LT tensile yield strength of the plate in ksi as measured in accordance with ASTM Standard E8 and ASTM B557, and where $FT\_TL$ is the T-L plane strain fracture toughness of the plate in ksi√inch as measured in accordance with ASTM E399. The shaded region of FIG. 7 is particularly suited for plate alloy products having a thickness of from about 2.0 to 2.5 inches to about 3.0, 3.125 or 3.25 inches, and of a T73, T74, T76 or T79 temper.

Figure 8:
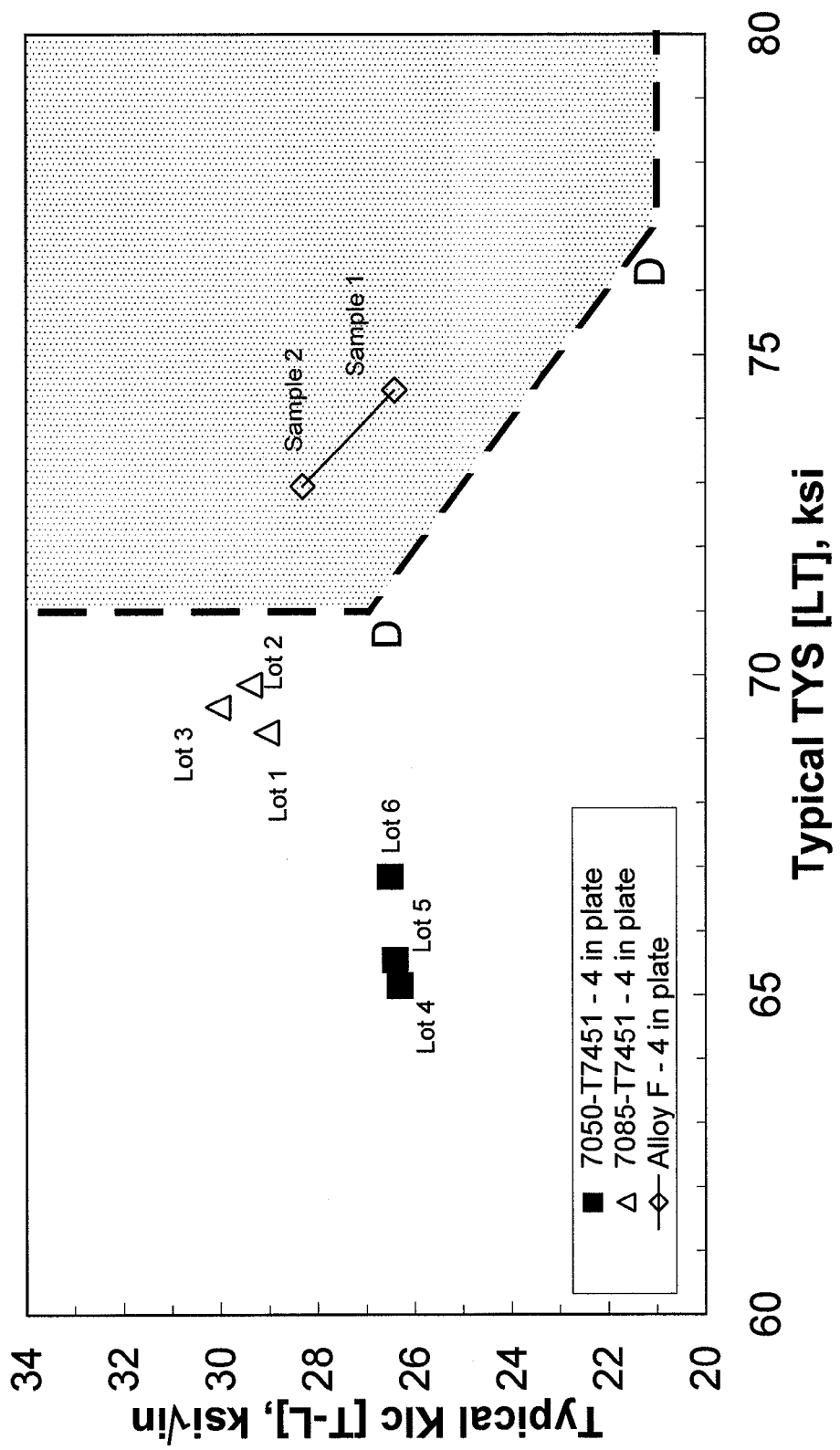
FIG. 8 is a graph illustrating typical T-L plane strain fracture toughness $K_{Ic}$ versus typical LT tensile yield strengths of plates of (i) example alloy F (having a thickness of 4.0 inches) and of a T74 temper, and (ii) several other conventional alloys (having a thickness of about 4 inches)

The properties of alloy F and various conventional alloys having a thickness of 4 inches are illustrated in FIG. 8. More particularly, FIG. 8 compares the plane-strain fracture toughness ($K_{Ic}$) in the T-L orientation as a function of the tensile

TABLE 7

| Alloy | Lot/Sample No | Thickness (inch) | Direction | TYS (ksi) | UTS (ksi) | Elongation (%) | Orientation | KIc (ksi√in) |
|---|---|---|---|---|---|---|---|---|
| 7050-T7451 | Lot 1 | 3 | LT | 66.2 | 76.6 | 11.4 | T-L | 28.2 |
| | | | ST | 62.0 | 73.4 | 6.2 | S-L | 28.0 |
| | Lot 2 | 3 | LT | 65.8 | 76.2 | 11.4 | T-L | 29.2 |
| | | | ST | 61.7 | 73.3 | 6.7 | S-L | 28.1 |
| | Lot 3 | 3 | LT | 65.3 | 75.3 | 11.0 | T-L | 30.0 |
| | | | ST | 61.0 | 72.5 | 6.6 | S-L | 28.8 |
| | Lot 4 | 4 | LT | 65.2 | 75.8 | 11.3 | T-L | 26.3 |
| | | | ST | 62.9 | 74.6 | 5.8 | S-L | 22.4 |
| | Lot 5 | 4 | LT | 65.6 | 76.1 | 10.8 | T-L | 26.4 |
| | | | ST | 62.4 | 73.5 | 5.6 | S-L | 26.6 |
| | Lot 6 | 4 | LT | 66.9 | 76.8 | 7.9 | T-L | 26.5 |
| | | | ST | 61.6 | 73.0 | 5.1 | S-L | 26.2 |
| 7085-T7451 | Lot 1 | 4 | LT | 69.1 | 76.4 | 10.5 | T-L | 29.1 |
| | | | ST | 64.4 | 74.1 | 7.5 | S-L | 32.3 |
| | Lot 2 | 4 | LT | 69.9 | 76.5 | 10.7 | T-L | 29.4 |
| | | | ST | 64.7 | 74.3 | 7.0 | S-L | 31.0 |
| | Lot 3 | 4 | LT | 69.5 | 76.9 | 10.6 | T-L | 30.1 |
| | | | ST | 65.4 | 74.8 | 6.2 | S-L | 32.1 |
| 7085-T7X51 | Lot 4, sample 2 | 3 | LT | 69.3 | 75.4 | 18.2 | T-L | 35.4 |
| | | 3 | ST | 66.5 | 75.0 | 13.5 | S-L | 39.6 |
| | Lot 4, sample 1 | 3 | LT | 68.6 | 74.5 | 19.0 | T-L | 37.2 |
| | | 3 | ST | 65.5 | 74.1 | 13.9 | S-L | 37.7 |
| Alloy E | Sample 1 | 3.125 | LT | 77.6 | 83.8 | 9.3 | T-L | 25.0 |
| | | | ST | 71.5 | 80.9 | 7.8 | S-L | 27.6 |
| | Sample 2 | 3.125 | LT | 74.7 | 82.0 | 9.7 | T-L | 26.9 |
| | | | ST | 69.7 | 79.4 | 8.6 | S-L | 29.4 |
| Alloy F | Sample 1 | 4 | LT | 74.5 | 80.3 | 10.0 | T-L | 26.4 |
| | | | ST | 69.2 | 78.2 | 7.8 | S-L | 25.1 |
| | Sample 2 | 4 | LT | 73.0 | 79.6 | 10.0 | T-L | 28.3 |
| | | | ST | 67.3 | 77.6 | 8.6 | S-L | 27.4 |

The properties of alloy E and various conventional alloys having a thickness of about 3 inches are illustrated in FIG. 7. More particularly, FIG. 7 compares the plane-strain fracture toughness ($K_{Ic}$) in the T-L orientation as a function of the tensile yield strength in the LT (long transverse) direction for alloy E (thickness of 3.125 inches), the 7050 control lots (having a thickness of about 3 inches) and data from the 3-inch 7085 lot. Alloy E realizes a significantly higher tensile yield strength with similar toughness to the 7050 control lots. Alloy E also realizes a strength-to-toughness relationship comparable to the 7085 alloy, but, as described below, the 7085 alloy is unable to consistently pass a seacoast environment SCC test. In other words, alloy E realizes an equal or yield strength in the LT (long transverse) direction for alloy F (thickness of 4.0 inches), the 7050 control lots (having a thickness of about 4 inches) and the 4-inch 7085 control lots. Alloy F realizes a significantly higher tensile yield strength with similar toughness to the 7050 control lots. Alloy F also realizes a strength-to-toughness relationship similar to that of the 7085 control lots, but, as described below, the 7085 alloy is unable to consistently pass a seacoast environment SCC test. In other words, alloy F achieves an equal or better stress corrosion resistance than a similarly produced and sized 7085 alloy, but at a higher LT strength. Thus, alloy F realizes a heretofore unrealized combination of LT strength, T-L toughness, and corrosion resistance at the stated thickness range.

FIG. 8 also includes a shaded region highlighting potential properties of alloy plate products of the instant disclosure. The shaded region is bound by a minimum toughness of 21 ksi√inch, a minimum strength of 71 ksi, and line D-D, which has an equation of FT_TL=−1.0*(TYS_LT)+98, where TYS_LT is the LT tensile yield strength of the plate in ksi as measured in accordance with ASTM Standard E8 and ASTM B557, where FT_TL is the T-L plane strain fracture toughness of the plate in ksi√inch as measured in accordance with ASTM E399. The shaded region of FIG. 8 is particularly suited for plate alloy products of having a thickness of from about 3.0 to 3.125 or 3.25 inches to about 3.5, 3.75 or 4 inches, and of a T73, T74, T76 or T79 temper.

Figure 9:
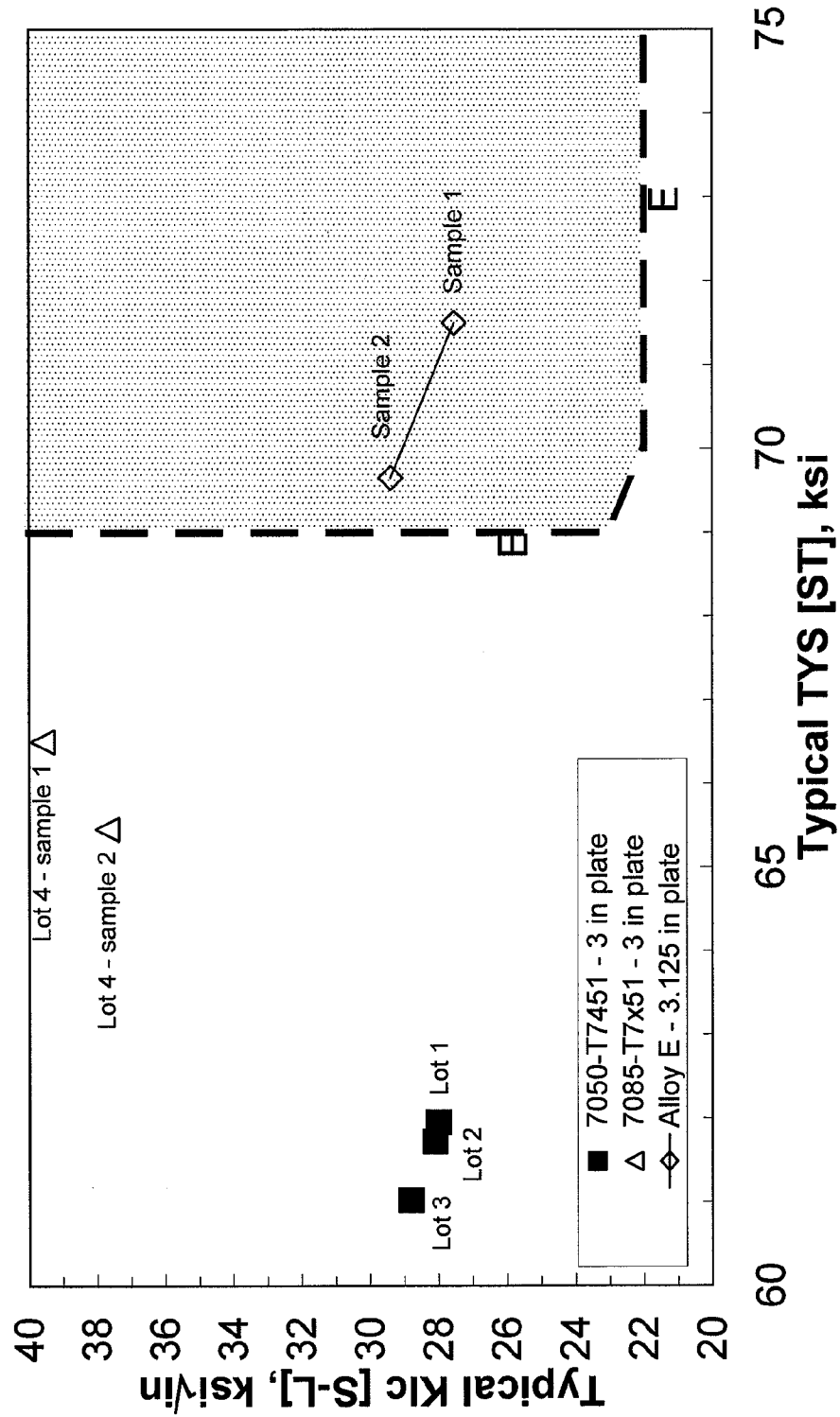
FIG. 9 is a graph illustrating typical S-L plane strain fracture toughness $K_{Ic}$ versus typical ST tensile yield strengths of plates of (i) example alloy E (having a thickness of 3.125 inches) and of a T74 temper, and (ii) several other conventional alloys (having a thickness of about 3 inches)

The properties of alloy E and various conventional alloys having a thickness of about 3 inches are also illustrated in FIG. 9. More particularly, FIG. 9 compares the plane-strain fracture toughness ($K_{Ic}$) in the S-L orientation as a function of the tensile yield strength in the ST (short transverse) direction for alloy E (thickness of 3.125 inches) and the 7050 control lots (having a thickness of about 3 inches) and the 3-inch 7085 control lot. Alloy E realizes a significantly higher tensile yield strength with similar toughness to the 7050 control lots. Alloy E also realizes a strength-to-toughness relationship similar to that of the 7085 control lot, but, as described below, the 7085 alloy is unable to consistently pass a seacoast environment SCC test. In other words, alloy E realizes an equal or better stress corrosion resistance than a similarly produced and sized 7085 alloy, but at a higher ST strength. Thus, alloy E realizes a heretofore unrealized combination of ST strength, S-L toughness, and corrosion resistance at the stated thickness range.

FIG. 9 also includes a shaded region highlighting potential properties of alloy plate products of the instant disclosure. The shaded region is bound by a minimum toughness of 22 ksi√inch, a minimum strength of 69 ksi, and line E-E, which has an equation of FT_SL=−1.1*(TYS_ST)+99, where TYS_ST is the ST tensile yield strength of the plate in ksi as measured in accordance with ASTM Standard E8 and ASTM B557, wherein FT_SL is the S-L plane strain fracture toughness of the plate in ksi√inch as measured in accordance with ASTM E399. The shaded region of FIG. 9 is particularly suited for plate alloy products having a thickness of from about 2.0 to 2.5 inches to about 3.0, 3.125 or 3.25 inches, and of a T73, T74, T76 or T79 temper.

The properties of alloy F and various conventional alloys having a thickness of about 4 inches are also illustrated in FIG. 10. More particularly, FIG. 10 compares the plane-strain fracture toughness ($K_{Ic}$) in the S-L orientation as a function of the tensile yield strength in the ST (short transverse) direction for alloy F (thickness of 4.0 inches) and the 7050 control lots (having a thickness of about 4 inches), and the 7085 control lots (having a thickness of about 4 inches). Alloy F realizes a significantly higher tensile yield strength with similar toughness to the 7050 control lots. Alloy F also realizes a strength-to-toughness relationship similar to that of the 7085 control lots, but, as described below, the 7085 alloy is unable to consistently pass a seacoast environment SCC test. In other words, alloy F achieves an equal or better stress corrosion resistance than a similarly produced and sized 7085 alloy, but at a higher ST strength. Thus, alloy F realizes a heretofore unrealized combination of ST strength, S-L toughness, and corrosion resistance at the stated thickness.

FIG. 10 also includes a shaded region highlighting potential properties of alloy plate products of the instant disclosure. The shaded region is bound by a minimum toughness of 20 ksi√inch, a minimum strength of 66 ksi, and line F-F, which has an equation of FT_SL=−1.1*(TYS_ST)+99, where TYS_ST is the ST tensile yield strength of the plate in ksi as measured in accordance with ASTM Standard E8 and ASTM B557, wherein FT_SL is the S-L plane strain fracture toughness of the plate in ksi√inch as measured in accordance with ASTM E399. The shaded region of FIG. 10 is particularly suited for plate alloy products having a thickness of from about 2.0 to 2.5 inches to about 3.0, 3.125 or 3.25 inches, and of a T73, T74, T76 or T79 temper.

Alloy F, in both aging conditions, was tested for exfoliation corrosion resistance (EXCO) in accordance with ASTM G34. Alloy F in both aging conditions achieved an EA rating consistent with good exfoliation corrosion resistance for a 7XXX alloy. Similar results would be expected if alloy E was subjected to EXCO testing. Thus, the instantly disclosed alloys obtain improvements in strength while retaining excellent exfoliation resistance characteristic, all specimens of alloy F achieving an EXCO rating of EA.

Alloys E, F and 7085 alloys were subjected to two types of stress corrosion cracking tests. A first test, an alternate immersion (AI) accelerated stress corrosion cracking (SCC) testing was performed for samples 1 and 2 of alloys E and F, as well as on the 7085 control plates on test specimens taken at mid-thickness (T/2) in the ST direction in accordance with ASTM G44, G47 and/or G49 standards. AI SCC testing results are illustrated in Table 8 (4-inch) and Table 9 (3-inch).

TABLE 8

| Alloy | TYS (LT) | Lot/ Sample No | Thickness (inch) | Stress (ksi) | # of tests | Days in test | Failures (days) |
|---|---|---|---|---|---|---|---|
| Alloy F | 74.5 ksi | Sample 1 | 4 | 40 | 3 | 100 | 53, 71, 78 |
|  |  |  |  | 50 | 3 | 100 | 51, 57, 58 |
|  | 73.0 ksi | Sample 2 | 4 | 40 | 3 | 100 | 74, 93, 100 |
|  |  |  |  | 50 | 3 | 100 | 63, 63, 63 |
| 7085-T7451 | 69.1 ksi | Lot 1 | 4 | 35 | 5 | 65 | No failures |
|  |  |  |  | 45 | 5 | 65 | 44, 50 and 58 |
|  | 69.9 ksi | Lot 2 | 4 | 35 | 5 | 65 | 60, 60 and 62 |
|  |  |  |  | 45 | 5 | 65 | 45, 46, 57, 57, 57 |
|  | 69.5 ksi | Lot 3 | 4 | 35 | 5 | 65 | No failures |
|  |  |  |  | 45 | 5 | 65 | 50, 57 |

TABLE 9

| Alloy | TYS (LT) | Lot/ Sample No | Thickness (inch) | Stress (ksi) | # of tests | Days in test | Failures (days) |
|---|---|---|---|---|---|---|---|
| Alloy E | 77.6 ksi | Sample 1 | 3.125 | 40 | 3 | 100 | 54, 54, 99 |
|  |  |  |  | 50 | 3 | 100 | 47, 52, 74 |
|  | 74.7 ksi | Sample 2 | 3.125 | 40 | 3 | 100 | 68, 74, 76 |
|  |  |  |  | 50 | 3 | 100 | 50, 54, 57 |
| 7085-T7451 | 68.6 ksi | Lot 4, sample 2 | 3 | 35 | 5 | 100 | 72, 73, 75 |
|  |  |  |  | 45 | 5 | 100 | 57, 61, 61, 64, 65 |
| 7085-T7651 | 69.4 ksi | Lot 4, sample 1 | 3 | 35 | 5 | 100 | 61, 65, 68, 81 |
|  |  |  |  | 45 | 5 | 100 | 48, 65, 65 |

Alloys E and F realized acceptable performance at stress levels of 40 and 50 ksi, which is 5 and 15 ksi, respectively, above the minimum requirements for qualifying an alloy as having a T74 temper.

Seacoast environment SCC testing was also performed for samples 1 and 2 of alloy E on test specimens taken at mid-thickness (T/2) in the ST direction. Seacoast environment SCC testing for alloy 7085 was also obtained. The specimens for the seacoast environment SCC testing are tested in constant strain fixtures (e.g., similar to those use in accelerated laboratory SCC testing). The seacoast SCC testing conditions include continuously exposing the samples via racks to a seacoast environment, where the samples are about 1.5 meters from the ground, the samples are oriented 45° from the horizontal, and a face of the sample face the prevailing winds. The samples are located about 100 meters from the coastline. In one embodiment, the coastline is of a rocky nature, with the prevailing winds oriented toward the samples so as to provide an aggressive salt-mist exposure (e.g., a location similar to the seacoast exposure station, Pt. Judith, R.I., USA of Alcoa Inc.). Seacoast SCC testing results for alloy E and 7085 alloys are illustrated in Table 10.

TABLE 10

| Alloy | TYS (LT) | Lot/ Sample No | Thickness (inch) | Stress (ksi) | # of tests | Days in test | Failures (days) |
|---|---|---|---|---|---|---|---|
| Alloy E | 77.6 ksi | Sample 1 | 3.125 | 40 | 3 | 262 | No failures |
|  |  |  |  | 50 | 3 | 262 | 60, 102 |
|  | 74.7 ksi | Sample 2 | 3.125 | 40 | 3 | 262 | No failures |
|  |  |  |  | 50 | 3 | 262 | No failures |
| 7085 | 68.6 ksi | Lot 4, sample 2 | 3 | 35 | 5 | 525 | No failures |
| 7085 | 69.4 ksi | Lot 4, sample 1 | 3 | 35 | 5 | 525 | 76, 132 and 3 with no failures |

Many samples of alloy E had not failed (a specimen fails when it separates into two pieces or a crack becomes visible with the naked eye) at a stress levels of 40 ksi and 50 ksi after 262 days of exposure. Recall that alloy E achieved LT strengths of 74.7 ksi and 77.6 ksi for samples 1 and 2, respectively. Conversely, 7085 alloys of similar thickness and only having LT strengths of 68.6, and 69.4 ksi failed zero out of 5 and 2 out of 5 times respectively. Note the trend in the 7085 data that for only minor increases in strength of the 7085 alloy, the ability to pass a seacoast environment SCC test decreases. It is anticipated that, if a 7085 alloy were processed to achieve an LT strength level of 72 ksi at a thickness of 3 inches, such a 7085 alloy would consistently fail a seacoast environment SCC test (at a stress of 35 ksi in the ST direction), whereas alloy E (and other alloys defined by the instant disclosure) would consistently pass a seacoast environment SCC test at the same strength and SCC stress level.

Thus, the instantly disclosed alloys are able to achieve a heretofore unrealized combination of strength, toughness, and corrosion resistance at the stated thickness ranges. In one embodiment, an aluminum alloy product of a T74 temper is provided. The aluminum alloy product may be made from a first plate, a second plate, and/or a third plate. If a first plate is utilized, the first plate will have a thickness of not greater than about 2.00 inches, and comprises an alloy composition of any of embodiments 1, 2, 3, 4 or 5 of FIGS. 2C-1, 2C-2, 2D-1, and 2D-2 or embodiments 1 or 2 of FIGS. 2E and 2F, as described above. If a second plate is utilized, the second plate will have a thickness of greater than 2.00 inches, but not greater than 3.00 inches, and comprises an alloy composition of any of embodiments 1, 2, 3, 4 or 5 of FIGS. 2C-1, 2C-2, 2D-1, and 2D-2 or embodiments 1 or 2 of FIGS. 2E and 2F, as described above. If a third plate is utilized, the third plate will have a thickness of greater than 3.00 inches, but not greater than 4.00 inches, and comprises an alloy composition of any of embodiments 1, 2, 3, 4 or 5 of FIGS. 2C-1, 2C-2, 2D-1, and 2D-2 or embodiments 1 or 2 of FIGS. 2E and 2F, as described above. The aluminum alloy product may comprise other compositions, such others of the above-noted composition levels.

Furthermore, in any of these embodiments, the aluminum alloy may consist essentially of the stated ingredients (aside from aluminum), the balance being aluminum and incidental elements and impurities.

In this embodiment, any first plate may have a strength-to-toughness relationship that satisfies the expression of $FT \geq -2.3*(TYS)+229$, wherein TYS is the L tensile yield strength of the first plate in ksi as measured in accordance with ASTM Standard E8 and ASTM B557, wherein FT is the L-T plane strain fracture toughness of the first plate in ksi$\sqrt{}$inch as measured in accordance with ASTM E399, where the first plate has a TYS of at least 74 ksi, where the first plate has a FT of at least 36 ksi$\sqrt{}$inch. In some of these embodiments, the plate may have a tensile yield strength of at least about 75 ksi, such as at least about 76 ksi or at least about 77 ksi or at least about 78 ksi or at least about 79 ksi, or even at least about 80 ksi. In some of these embodiments, the plate may have a toughness of at least about 40 ksi$\sqrt{}$inch, such as at least about 42 ksi$\sqrt{}$inch or at least about 44 ksi$\sqrt{}$inch or at least about 46 ksi$\sqrt{}$inch or at least about 48 ksi$\sqrt{}$inch or even at least about 50 ksi$\sqrt{}$inch.

In this embodiment, any second plate may have a strength-to-toughness relationship that satisfies the expression $FT\_TL \geq -1.0*(TYS\_LT)+98$ where TYS_LT is the LT tensile yield strength of the second plate in ksi as measured in accordance with ASTM Standard E8 and ASTM B557, wherein FT_TL is the T-L plane strain fracture toughness of the second plate in ksi$\sqrt{}$inch as measured in accordance with ASTM E399, wherein the second plate has a TYS_LT of at least 72 ksi, and where the second plate has a FT_TL of at least 24.5 ksi$\sqrt{}$inch. In some of these embodiments, the plate may have a tensile yield strength of at least about 73 ksi, such as at least about 74 ksi or as at least about 75 ksi or at least about 76 ksi or even at least about 77 ksi. In some of these embodiments, the plate may have a toughness of at least about 25 ksi$\sqrt{}$inch, such as at least about 26 ksi$\sqrt{}$inch or at least about 27 ksi$\sqrt{}$inch or even at least about 28 ksi$\sqrt{}$inch.

In this embodiment, any second plate may have a strength-to-toughness relationship that satisfies the expression $FT\_SL \geq -1.1*(TYS\_ST)+99$, where TYS_ST is the ST tensile yield strength of the second plate in ksi as measured in accordance with ASTM Standard E8 and ASTM B557, wherein FT_SL is the S-L plane strain fracture toughness of the second plate in ksi$\sqrt{}$inch as measured in accordance with ASTM E399, where the second plate has a TYS_ST of at least 69 ksi, where the second plate has a FT_SL of at least 25 ksi$\sqrt{}$inch. In some of these embodiments, the plate may have a tensile yield strength of at least about 69.5 ksi, such as at least about 70 ksi or as at least about 70.5 ksi or even at least about 71 ksi. In some of these embodiments, the plate may have a toughness of at least about 26 ksi$\sqrt{}$inch, such as at least about 27 ksi$\sqrt{}$inch or at least about 28 ksi$\sqrt{}$inch or at least about 29 ksi$\sqrt{}$inch or at least about 30 ksi$\sqrt{}$inch or even at least about 31 ksi$\sqrt{}$inch.

In this embodiment, any third plate may have a strength-to-toughness relationship that satisfies the expression $FT\_TL=-1.0*(TYS\_LT)+98$, where TYS_LT is the LT tensile yield strength of the third plate in ksi as measured in accordance with ASTM Standard E8 and ASTM B557, wherein FT_TL is the T-L plane strain fracture toughness respectively of the third plate in ksi$\sqrt{}$inch as measured in accordance with ASTM E399, where the third plate has a TYS_LT of at least 71 ksi, and where the third plate has a FT_TL of at least 23 ksi$\sqrt{}$inch. In some of these embodiments, the plate may have a tensile yield strength of at least about 71.5 ksi, such as at least about 72 ksi or as at least about 72.5 ksi or at least about 73 ksi or at least about 73.5 ksi or even at least about 74 ksi. In some of these embodiments, the plate may have a toughness of at least about 24 ksi√inch, such as at least about 25 ksi√inch or at least about 26 ksi√inch or at least about 27 ksi√inch or at least about 28 ksi√inch or even at least about 29 ksi√inch.

In this embodiment, any third plate may have a strength-to-toughness relationship that satisfies the expression FT_SL≥−1.1*(TYS_ST)+99, where TYS_ST is the ST tensile yield strength of the third plate in ksi as measured in accordance with ASTM Standard E8 and ASTM B557, where FT_SL is the S-L plane strain fracture toughness of the third plate in ksi√inch as measured in accordance with ASTM E399, where the third plate has a TYS_ST of at least 66 ksi, and where the third plate has a FT_SL of at least 23 ksi√inch. In some of these embodiments, the plate may have a tensile yield strength of at least about 66.5 ksi, such as at least about 67 ksi or as at least about 67.5 ksi or at least about 68 ksi or at least about 68.5 ksi or even at least about 69 ksi. In some of these embodiments, the plate may have a toughness of at least about 24 ksi√inch, such as at least about 25 ksi√inch or at least about 26 ksi√inch or at least about 27 ksi√inch or even at least about 28 ksi√inch.

In this embodiment, any of the first, second, or third plates may consistently pass one or more stress corrosion cracking tests. In a particular embodiment, and by the definition of a T74 temper, the plates consistently pass seacoast environment stress corrosion cracking (SCC) resistance tests (described below) at a stress of at least 35 ksi in the ST direction, or at least about 40 ksi in the ST direction, or even at least about 45 ksi in the ST direction, and for a period of at least 180 days. In some embodiments, the plates consistently pass the seacoast environment SCC test for a period of least 230 days or at least 280 days or at least 330 days or even at least 365 days, at the stated stress level(s). In a particular embodiment, the plates consistently pass an alternate immersion SCC test (in accordance with ASTM G44, G47 and/or G49 standards) for a period of at least 30 days. In some embodiments, the plates consistently pass the alternate immersion SCC test for a period of least 40 days or at least 60 days or at least 80 days or even at least 100 days. No conventional 7XXX series alloys in a T74 temper are known to be able to achieve all of (i) the above-provided strength at the provided thickness range, (ii) the above-provided toughness at the provided thickness range, (iii) the above-provided strength-to-toughness relationships at the provided thickness range, and (iv) the ability to consistently pass one or both of the above-noted SCC tests at the provided thickness range.

In another embodiment, an aluminum alloy product of a T76 temper is provided. The aluminum alloy product may be made from a first plate, a second plate, and/or a third plate. If a first plate is utilized, the first plate will have a thickness of not greater than about 2.00 inches, and comprises an alloy composition of any of embodiments 1, 2, 3, 4 or 5 of FIGS. 2C-1, 2C-2, 2D-1, and 2D-2 or embodiments 1 or 2 of FIGS. 2E and 2F, as described above. If a second plate is utilized, the second plate will have a thickness of greater than 2.00 inches, but not greater than 3.00 inches, and comprises an alloy composition of any of embodiments 1, 2, 3, 4 or of FIGS. 2C-1, 2C-2, 2D-1, and 2D-2 or embodiments 1 or 2 of FIGS. 2E and 2F, as described above. If a third plate is utilized, the third plate will have a thickness of greater than 3.00 inches, but not greater than 4.00 inches, and comprises an alloy composition of any of embodiments 1, 2, 3, 4 or 5 of FIGS. 2C-1, 2C-2, 2D-1, and 2D-2 or embodiments 1 or 2 of FIGS. 2E and 2F as described above. The aluminum alloy product may comprise other compositions, such others of the above-noted composition levels. Furthermore, in any of these embodiments, the aluminum alloy may consist essentially of the stated ingredients (aside from aluminum), the balance being aluminum and incidental elements and impurities.

In this embodiment, any first plate may have a strength-to-toughness relationship that satisfies the expression FT≥−2.3*(TYS)+229, wherein TYS is the L tensile yield strength of the first plate in ksi as measured in accordance with ASTM Standard E8 and ASTM B557, wherein FT is the L-T plane strain fracture toughness of the first plate in ksi√inch as measured in accordance with ASTM E399, where the first plate has a TYS of at least 79 ksi, where the first plate has a FT of at least 30 ksi√inch. In some of these embodiments, the plate may have a tensile yield strength of at least about 80 ksi, such as at least about 81 ksi or as at least about 82 ksi or at least about 83 ksi or at least about 84 ksi or at least about 85 ksi, or even at least about 86 ksi. In some of these embodiments, the plate may have a toughness of at least about 32 ksi√inch, such as at least about 34 ksi√inch or at least about 36 ksi√inch or at least about 38 ksi√inch or at least about 40 ksi√inch or even at least about 42 ksi√inch.

In this embodiment, any second plate may have a strength-to-toughness relationship that satisfies the expression FT_TL≥−1.0*(TYS_LT)+98 where TYS_LT is the LT tensile yield strength of the second plate in ksi as measured in accordance with ASTM Standard E8 and ASTM B557, wherein FT_TL is the T-L plane strain fracture toughness of the second plate in ksi√inch as measured in accordance with ASTM E399, wherein the second plate has a TYS_LT of at least 76 ksi, and where the second plate has a FT_TL of at least 22 ksi√inch. In some of these embodiments, the plate may have a tensile yield strength of at least about 77 ksi, such as at least about 78 ksi or as at least about 79 ksi or at least about 80 ksi or even at least about 81 ksi. In some of these embodiments, the plate may have a toughness of at least about 22.5 ksi√inch, such as at least about 23 ksi√inch or at least about 23.5 ksi√inch or at least about 24 ksi√inch or at least about 24.5 ksi√inch or even at least about 25 ksi√inch.

In this embodiment, any second plate may have a strength-to-toughness relationship that satisfies the expression FT_SL≥−1.1*(TYS_ST)+99, where TYS_ST is the ST tensile yield strength of the second plate in ksi as measured in accordance with ASTM Standard E8 and ASTM B557, wherein FT_SL is the S-L plane strain fracture toughness of the second plate in ksi√inch as measured in accordance with ASTM E399, where the second plate has a TYS_ST of at least 71 ksi, where the second plate has a FT_SL of at least 22 ksi√inch. In some of these embodiments, the plate may have a tensile yield strength of at least about 71.5 ksi, such as at least about 72 ksi or as at least about 72.5 ksi or even at least about 73 ksi. In some of these embodiments, the plate may have a toughness of at least about 23 ksi√inch, such as at least about 24 ksi√inch or at least about 25 ksi√inch or at least about 26 ksi√inch or at least about 27 ksi√inch or even at least about 28 ksi√inch.

In this embodiment, any third plate may have a strength-to-toughness relationship that satisfies the expression FT_TL≥−1.0*(TYS_LT)+98, where TYS_LT is the LT tensile yield strength of the third plate in ksi as measured in accordance with ASTM Standard E8 and ASTM B557, wherein FT_TL is the T-L plane strain fracture toughness respectively of the third plate in ksi√inch as measured in accordance with ASTM E399, where the third plate has a TYS_LT of at least 75 ksi, and where the third plate has a FT_TL of at least 21 ksi√inch. In some of these embodiments, the plate may have a tensile yield strength of at least about 75.5 ksi, such as at least about 76 ksi or as at least about 76.5 ksi or at least about 77 ksi or at least about 77.5 ksi or even at least about 78 ksi. In some of these embodiments, the plate may have a toughness of at least about 22 ksi√inch, such as at least about 23 ksi√inch or at least about 24 ksi√inch or at least about 25 ksi√inch or at least about 26 ksi√inch or even at least about 27 ksi√inch.

In this embodiment, any third plate may have a strength-to-toughness relationship that satisfies the expression FT_SL≥−1.1*(TYS_ST)+99, where TYS_ST is the ST tensile yield strength of the third plate in ksi as measured in accordance with ASTM Standard E8 and ASTM B557, where FT_SL is the S-L plane strain fracture toughness of the third plate in ksi√inch as measured in accordance with ASTM E399, where the third plate has a TYS_ST of at least 70 ksi, and where the third plate has a FT_SL of at least 20 ksi√inch. In some of these embodiments, the plate may have a tensile yield strength of at least about 70.5 ksi, such as at least about 71 ksi or as at least about 71.5 ksi or at least about 72 ksi or at least about 72.5 ksi or even at least about 73 ksi. In some of these embodiments, the plate may have a toughness of at least about 21 ksi√inch, such as at least about 22 ksi√inch or at least about 23 ksi√inch or at least about 24 ksi√inch or even at least about 25 ksi√inch.

In this embodiment, any of the first, second, or third plates may consistently pass one or more stress corrosion cracking tests. In a particular embodiment, and by the definition of a T76 temper, the plates consistently pass seacoast environment stress corrosion cracking (SCC) resistance tests (described below) at a stress range of at least about 25 ksi (e.g., a range from 25 ksi to 34 ksi) in the ST direction and for a period of at least 180 days. In some embodiments, the plates consistently pass the seacoast environment SCC test for a period of least 230 days or at least 280 days or at least 330 days or even at least 365 days, at the stated stress level(s). In a particular embodiment, the plates consistently pass an alternate immersion SCC test (in accordance with ASTM G44, G47 and/or G49 standards) for a period of at least 30 days. In some embodiments, the plates consistently pass the alternate immersion SCC test for a period of least 40 days or at least 60 days or at least 80 days or even at least 100 days. No conventional 7XXX series alloys in a T76 temper are known to be able to achieve all of (i) the above-provided strength at the provided thickness range, (ii) the above-provided toughness at the provided thickness range, (iii) the above-provided strength-to-toughness relationships at the provided thickness range, and (iv) the ability to consistently pass one or both of the above-noted SCC tests at the provided thickness range.

In one embodiment, an aluminum alloy is used as an upper wing skin for an aerospace vehicle. The upper wing skin may be made from an aluminum alloy plate having a thickness of not greater than about 2.00 inches, where the aluminum alloy comprises any of the compositions of embodiments 1, 2, 3, 4 or 5 of FIGS. 2C-1, 2C-2, 2D-1, and 2D-2. The aluminum alloy product may (less often) comprise other compositions, such any of the other above-noted composition levels. In any of these embodiments, the aluminum alloy may consistent essentially of the stated ingredients (aside from aluminum), the balance being aluminum and incidental elements and impurities. In these embodiments, the aluminum alloy plate may have a strength-to-toughness relationship that satisfies the expression FT≥−4.0*(TYS)+453, wherein TYS is the L tensile yield strength of the plate in ksi as measured in accordance with ASTM Standard E8 and ASTM B557, wherein FT is the L-T plane stress fracture toughness ($K_{app}$) of the plate in ksi√inch, wherein FT is measured in accordance with ASTM Standard E561 and B646 on a center-cracked aluminum alloy specimen taken from the T/2 location of an aluminum alloy plate, wherein the specimen has a width of 16 inches, a thickness of 0.25 inch and a initial fatigue pre-crack length of 4 inches. In some of these embodiments, the plate may have a yield strength of at least about 80 ksi, such as at least about 81 ksi or at least about 82 ksi or at least about 83 ksi or at least about 84 ksi, or even at least about 85 ksi. In some of these embodiments, the plate may have a toughness of at least about 100 ksi√inch, such as at least about 101 ksi√inch or at least about 102 ksi√inch or at least about 103 ksi√inch or at least about 104 ksi√inch or even at least about 105 ksi√inch. The upper wing skin plate may also achieve improved plane strain fracture toughness ($K_{Ic}$) in addition to the improved tensile yield strength and plane stress fracture toughness. Thus, in these embodiments, the plate may have a strength-to-toughness relationship that satisfies the expression of FT-K1C≥−2.3*(TYS)+229, wherein TYS is the L tensile yield strength, as described above, and wherein FT-K1C is the L-T plane strain fracture toughness of the plate in ksi√inch as measured in accordance with ASTM E399, where the plate has a FT-K1C of at least 34 ksi√inch. In some of these embodiments, the plate may a FT-K1C fracture toughness of at least about 36 ksi√inch, such as at least about 38 ksi√inch or at least about 40 ksi√inch or even at least about 42 ksi√inch. No conventional 7XXX series alloys are known to be able to achieve all of (i) the above-provided strength at the provided thickness range, (ii) the above-provided toughness at the provided thickness range, and (iii) the above-provided strength-to-toughness relationships at the provided thickness range. These alloys may also be able to achieve the corrosion resistance provided for in Example 2, above.

While the majority of the instant disclosure has been presented in terms of alloy plates, it is expected that similar improvements will be realized with the instantly disclosed alloy in other product forms, such as extrusions and forgings. Moreover, while specific embodiments of the instant disclosure has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the instant disclosure which is to be given the full breadth of the appended claims and any and all equivalents thereof.

What is claimed is:

1. An aluminum alloy consisting essentially of:
   7.5-7.9 wt. % Zn;
   2.05-2.20 wt. % Cu;
   1.6-1.75 wt. % Mg;
   0.05-0.3 wt. % of Zr;
   optionally up to 0.25 wt % of at least one of Hf, Sc, and V;
   less than 0.1 wt. % Mn;
   less than 0.05 wt. % Cr;
   the balance aluminum and impurities.

* * * * *